United States Patent [19]

Niihara et al.

[11] Patent Number: 5,854,940
[45] Date of Patent: Dec. 29, 1998

[54] OUTPUT CONTROL SYSTEM FOR INTERPRETING INPUT DATA ACCORDING TO A SPECIFIC CONTROL LANGUAGE BASED UPON OUTPUTS FROM A PLURALITY OF CONTROL LANGUAGE DETERMINING DEVICES

[75] Inventors: Katsuhisa Niihara; Koichi Miyazaki; Yoshinori Gunji; Ichiro Konno; Yuji Shiomi, all of Iwatsuki, Japan

[73] Assignee: Fuji Xerox Co., Ltd., Japan

[21] Appl. No.: 636,438

[22] Filed: Apr. 23, 1996

[30] Foreign Application Priority Data

Apr. 24, 1995 [JP] Japan .................................. 7-098953
Apr. 24, 1995 [JP] Japan .................................. 7-098954

[51] Int. Cl.⁶ .................................................. G06F 13/00
[52] U.S. Cl. ..................... 395/825; 395/106; 395/112; 395/114; 395/500
[58] Field of Search ................. 395/112, 114, 395/500, 825, 106

[56] References Cited

U.S. PATENT DOCUMENTS

| | | | |
|---|---|---|---|
| 5,293,466 | 3/1994 | Bringmann | 395/114 |
| 5,392,419 | 2/1995 | Walton | 395/500 |
| 5,555,435 | 9/1996 | Campbell et al. | 395/112 |
| 5,561,744 | 10/1996 | Sugaya et al. | 395/112 |

FOREIGN PATENT DOCUMENTS

| | | |
|---|---|---|
| 4-323069 | 11/1992 | Japan . |
| 5-104825 | 4/1993 | Japan . |
| 5-88822 | 4/1993 | Japan . |
| 5-96823 | 4/1993 | Japan . |
| 5-282109 | 10/1993 | Japan . |

*Primary Examiner*—Thomas C. Lee
*Assistant Examiner*—Albert Wang
*Attorney, Agent, or Firm*—Finnegan, Henderson, Farabow, Garrett & Dunner, L.L.P.

[57] ABSTRACT

An output controlling device for reducing a processing time and substantially reducing erroneous determinations. In an image recording apparatus or the like, when a control language describing input data sent from a higher level apparatus is determined, determining rules set for respective control languages are consecutively applied. Since an optimum determining rule can be applied with respect to each control language, it is possible to simultaneously attain a reduction in the processing time and a lowering of the possibility of erroneous determination as compared with a case where the same determining rule is applied uniformly. In addition, if command groups are classified, and different determining rules are used for respective groups, the case is equivalent to a case where a plurality of determining rules are applied with respect to each control language, so that a further reduction in the processing time and a further lowering of the possibility of erroneous determination can be attained.

5 Claims, 20 Drawing Sheets

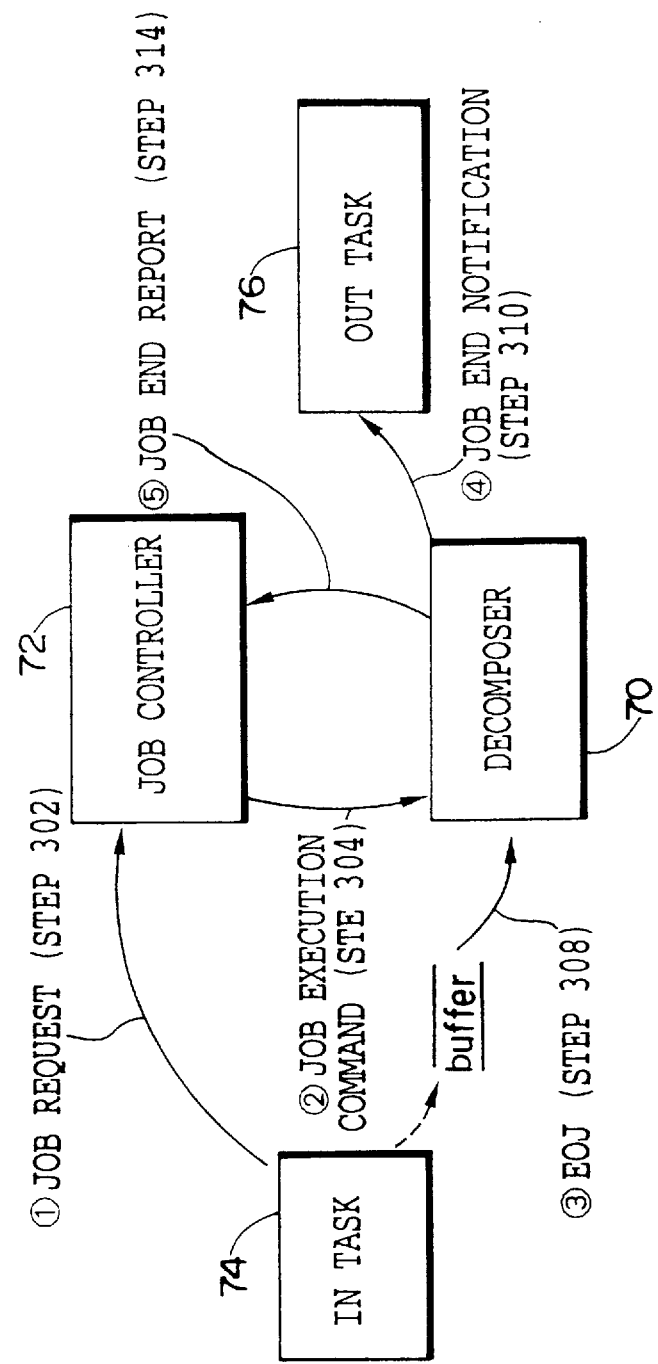

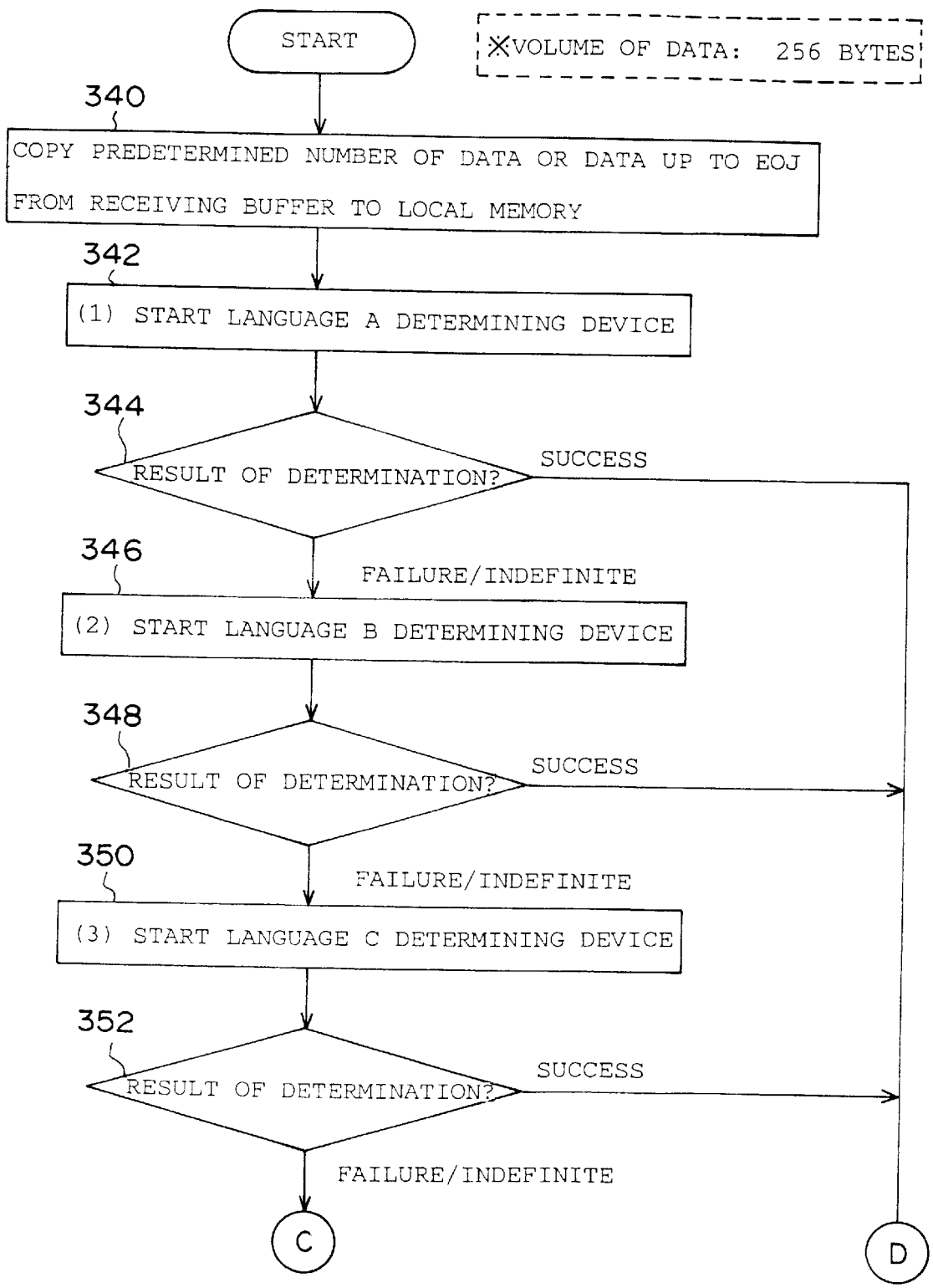

F I G. 15B
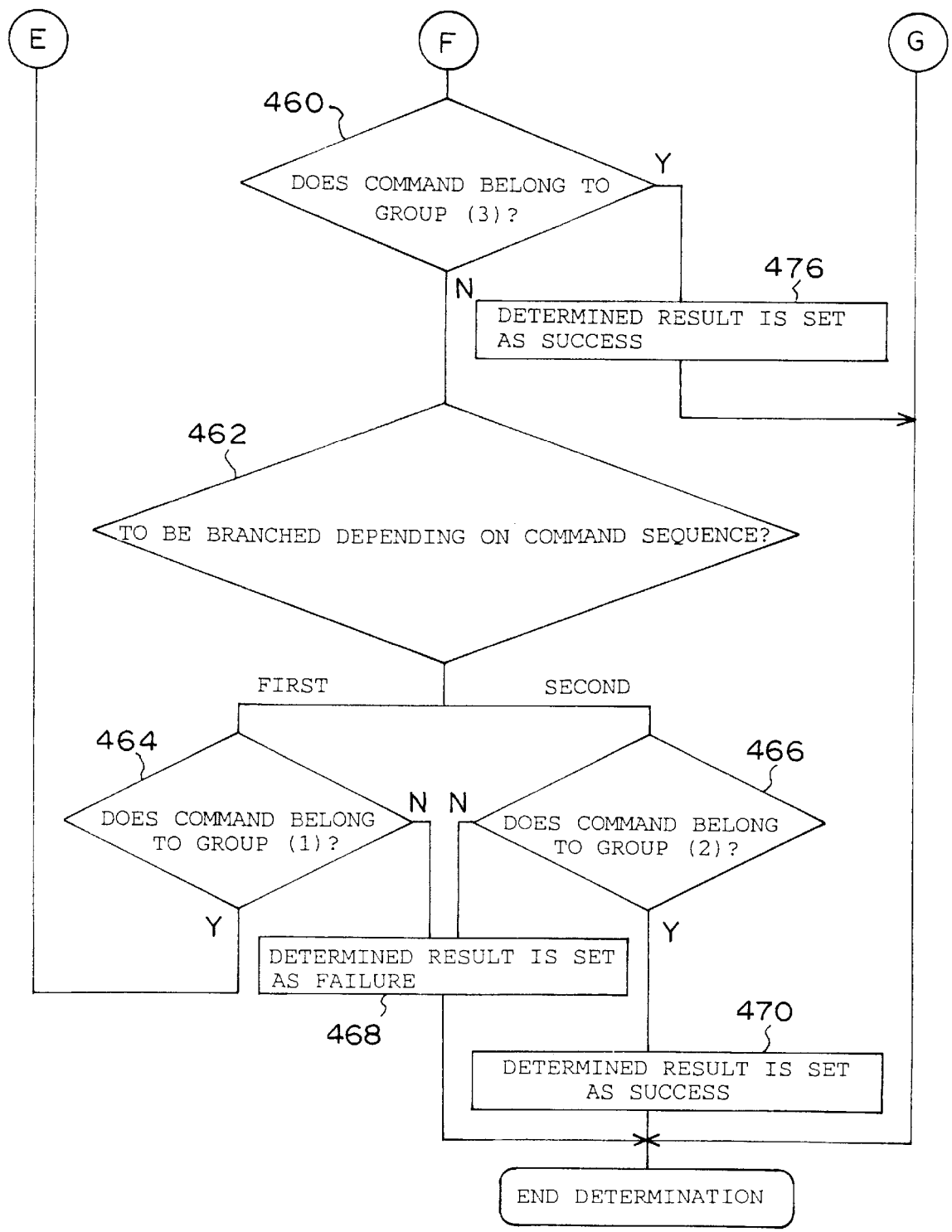

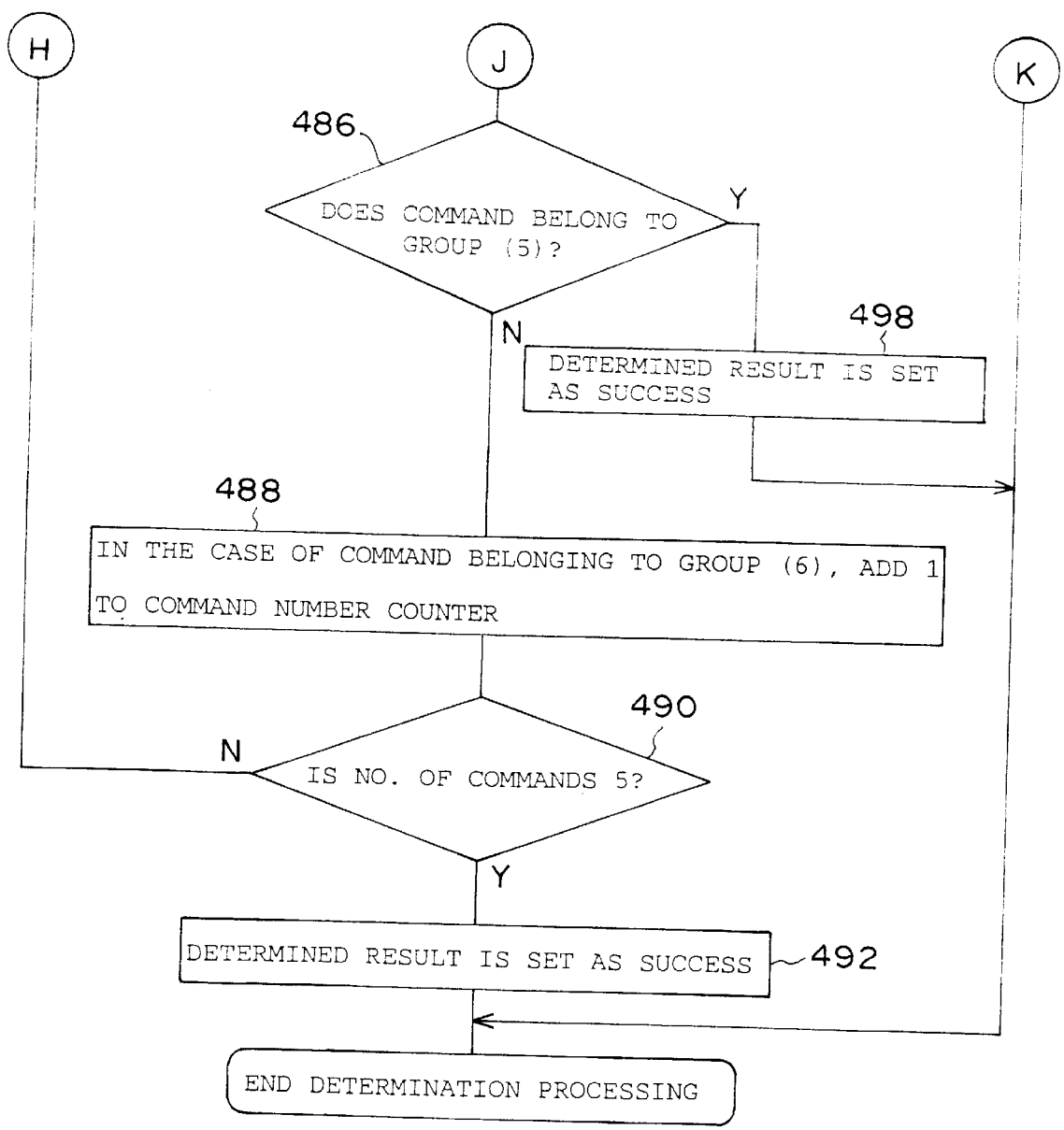

OUTPUT CONTROL SYSTEM FOR INTERPRETING INPUT DATA ACCORDING TO A SPECIFIC CONTROL LANGUAGE BASED UPON OUTPUTS FROM A PLURALITY OF CONTROL LANGUAGE DETERMINING DEVICES

BACKGROUND OF THE INVENTION

1. Field of the Invention

The present invention relates to an output controlling device for controlling an output of an image recording apparatus or the like, and more particularly to an output controlling device of an image recording apparatus which interprets a control language describing data received from a higher level apparatus, such as a host computer, and which records an image on the basis of the interpretation of the control language.

2. Description of the Related Art

Conventionally, techniques disclosed in Japanese Patent Application Laid-Open Nos. 5-282109, 5-104825, 4-323069, 5-96823, and 5-88822, which will be described below, are known as means for determining the kind of control language received from a host computer or the like in an image recording apparatus, such as a printer.

According to Japanese Patent Application Laid-Open No. 5-282109, a technique is disclosed wherein the kind of control language is discriminated on the basis of a characteristic code peculiar to each mode. This technique adopts a method wherein if the kind of control language cannot be discriminated even by the aforementioned method, the kind of control language is discriminated by a characteristic code of a built-in mode of the relevant apparatus, if the kind of control language cannot be discriminated even by that method, the kind of control language is discriminated by a characteristic code of a card mode, and if the kind of control language cannot be discriminated even by that method, it is assumed that the kind of control language cannot be discriminated.

According to Japanese Patent Application Laid-Open No. 5-104825, a technique is disclosed wherein a control code in input data, such as an escape sequence, is determined, and if all of a predetermined portion consists of characters, emulation of a language (PostScript) for controlling a printer by means of character strings is set as an object of analysis.

According to Japanese Patent Application Laid-Open No. 4-323069, a method is disclosed wherein a table of command codes exhibiting high frequencies of appearance is prepared for each kind of control language, and the kind of control language is determined by comparing codes of input data with codes of the table and on the basis of the table exhibiting the greatest number of coinciding command codes.

According to Japanese Patent Application Laid-Open No. 5-96823, a determining method is disclosed wherein a comparison table is provided for each emulation, units of minute data strings in the data sent from a host computer are retrieved from each table, and each time the data strings coincide, weights set on the data strings are added, whereby an emulation finally exhibiting a largest added value is selected. In this determining method, as a reference time for deciding the result of determination, the time when any one of the emulations has reached an added value greater than or equal to a predetermined value, the time when the difference with the second largest added value has reached a predetermined value or more, or other similar time is adopted.

According to Japanese Patent Application Laid-Open No. 5-88822, the following determining method is disclosed. Namely, a determination is made as to whether control characters included in input data are present in systems starting with a command system of a lower priority, and if the control characters are not present, that command system is excluded from the object of selection. Then, when only one command system remained, that command system is selected as the result of determination. If there are two or more remaining command systems, other command characters are retrieved from a remaining command system, and the determination is made by the presence or absence of the relevant control characters. In addition, if two or more command systems remained as a result of retrieving a required volume of data, a command system having a higher priority is selected. The required volume refers to the capacity of a receiving buffer or the volume of data of total pages. The total pages refers to data received until the data reception interval has reached a reference time or more.

However, the following drawbacks are encountered in the above-described conventional techniques.

With the technique disclosed in Japanese Patent Application Laid-Open No. 5-282109, the built-in mode whose frequency of use is estimated to be high is checked first. However, there are drawbacks in that which mode exhibits a high frequency of use differs among the users, and the speed of determination processing is not taken into consideration.

With the technique disclosed in Japanese Patent Application Laid-Open No. 5-104825, the determination is made in two steps, i.e., the step of determining a control code, and the step of determining that all the predetermined portion consists of characters, so that there is a drawback in that it takes time in the determination processing.

With the technique disclosed in Japanese Patent Application Laid-Open No. 4-323069, since the determination processing is carried out on the basis of a command code peculiar to one control language, a distinction cannot be made with other control languages in which the relevant command code is provided as mere data. Hence, there is a drawback in that the possibility of making an erroneous determination is very large.

Further, the techniques disclosed in Japanese Patent Application Laid-Open Nos. 5-96823 and 5-88822 provide methods in which the control language is determined on the basis of an added value or the like of control characters and data strings or the like with respect to each control language, in the same way as the above-described techniques. As such, the determining method is not optimized for each control language, so that these techniques are essentially fraught with the drawback that a long processing time is required.

SUMMARY OF THE INVENTION

In view of the above-described circumstances, it is an object of the present invention to provide an output controlling device capable of enhancing determination accuracy and of improving the processing speed for determining a control language, by providing control-language determining means for respective control languages so as to determine that a control language of input data is a particular control language.

To attain the above object, in accordance with a first aspect of the present invention, there is provided an output controlling device comprising: storage means for storing input data; a plurality of control-language determining means each adapted to determine that a control language of the input data is a particular control language; deciding means for deciding the control language of the input data on the basis of a result of determination by the plurality of control-language determining means; and output means for interpreting the input data on the basis of the control language decided by the deciding means, and for outputting the input data.

In accordance with the first aspect of the present invention, the storage means stores the input data, and the plurality of control-language determining means are each adapted to determine that the control language of the stored input data is a particular control language. Then, the deciding means decides the control language of the input data on the basis of a result of determination by the plurality of control-language determining means. The output means interprets the input data on the basis of the control language decided by the deciding means, and outputs the input data. Since the determining means for determining the control languages are prepared for the respective control languages, if an optimum determining means is used for each control language, it is possible to improve the determination accuracy, with the result that an image or the like can be outputted on the basis of an optimum control language.

In accordance with a second aspect of the present invention, at least one of the plurality of control-language determining means in the first aspect of the present invention has a determining rule different from those of other control-language determining means.

In the second aspect of the present invention, since at least one of the plurality of control-language determining means has a determining rule different from those of other control-language determining means, it is possible to avoid the possibility of erroneous determination as compared with a case where an identical determining rule, e.g., a determining rule based on a peculiar command code, is provided for all the control-language determining means.

In accordance with a third aspect of the present invention, at least one of the plurality of control-language determining means in the second aspect of the present invention has a determining rule for determining that the language of the input data is a particular control language, on the basis of the order of appearance of particular codes in the input data.

In the third aspect of the present invention, since at least one control-language determining means has a determining rule for determining that the language of the input data is a particular control language, on the basis of the order of appearance of particular codes in the input data, it is possible to substantially improve the determination accuracy as compared with a case where a determination is merely made on the basis of the presence or absence of a particular code.

In accordance with a fourth aspect of the present invention, at least one of the plurality of control-language determining means in the second aspect of the present invention has a determining rule for determining that the language of the input data is a particular control language, when the number of appearances of particular codes in the input data has reached a predetermined number.

In the fourth aspect of the present invention, since at least one control-language determining means has a determining rule for determining that the language of the input data is a particular control language, when the number of appearances of particular codes in the input data has reached a predetermined number, it is possible to reduce the possibility of erroneous determination as compared with the case where a determination is merely made on the basis of the presence or absence of a particular code.

In accordance with a fifth aspect of the present invention, at least one of the plurality of control-language determining means in the second aspect of the present invention has a plurality of determining rules.

In the fifth aspect of the present invention, since at least one control-language determining means determines the input data by applying a plurality of determining rules. Hence, it is possible to reduce the possibility of erroneous determination as compared with the case where only one determining rule is applied.

In accordance with a sixth aspect of the present invention, the deciding means in the first aspect of the present invention decides that the control language of the input data is the control language for which the determination is successful in a case where one of the plurality of control-language determining means has succeeded in the determination of the control language.

In the sixth aspect of the present invention, when the plurality of control-language determining means are respectively operated in determining that the control language of the input data is a particular control language, and in a case where one control-language determining means has succeeded in the determination of the control language, the deciding means decides that the control language of the input data is the control language for which the determination is successful. Then, the output means interprets the input data on the basis of the decided control language, and outputs the input data. Since the control language is decided if one control-language determining means succeeds in determination even when the other control-language determining means are effecting determination processing, it is possible to improve the determining speed.

In accordance with a seventh aspect of the present invention, the deciding means in the first aspect of the present invention causes the plurality of control-language determining means to effect determination processing in decreasing order of determining speed.

In the seventh aspect of the present invention, the deciding means causes the plurality of control-language determining means to effect determination processing in decreasing order of determining speed, and decides the control language of the input data on the basis of the result of determination. For example, if an arrangement is provided such that the control language is immediately decided if one control-language determining means has succeeded in determination as in the sixth aspect of the present invention, the determining speed can be increased most in a case where the plurality of control-language determining means are consecutively made to effect determination.

In accordance with an eighth aspect of the present invention, there is provided an output controlling device comprising: storage means for storing input data; a plurality of control-language determining means each adapted to determine that a control language of the input data is a particular control language; group determining means for determining control languages as a group with respect to control-language determining means belonging to a group in which subject control languages are similar among the plurality of control-language determining means; deciding means for deciding the control language of the input data on the basis of results of determination by the group determining means and control-language determining means not belonging to the group; and output means for interpreting the input data on the basis of the control language decided by the deciding means, and for outputting the input data.

In the eighth aspect of the present invention, the storage means stores the input data, and the plurality of control-language determining means are each adapted to determine that the control language of the stored input data is a particular control language. In this determination, the group determining means determines control languages as a group with respect to the control-language determining means belonging to a group in which subject control languages are similar among the plurality of control-language determining means. Next,, the deciding means decides the control language of the input data on the basis of results of determination by the group determining means and control-language determining means not belonging to the group. Then, the output means interprets the input data on the basis of the control language decided by the deciding means, and outputs the input data. Since the control languages are determined as a group as for the determination of similar control languages which are liable to be erroneously determined with respect to each other, erroneous determinations are obviated, thereby making it possible to attain a substantial improvement in determination accuracy.

In accordance with a ninth aspect of the present invention, the group determining means in the eighth aspect of the present invention determines the control language for the group in accordance with a predetermined criteria in a case where none of the plurality of control-language determining means are able to determine the control language of the input data as being a particular control language.

In the ninth aspect of the present invention, the control language of the group is determined in accordance with a predetermined criteria in a case where none of the plurality of control-language determining means are able to determine the control language of the input data as being a particular control language. As the predetermined criteria, it is possible to use, among others, a criteria whereby a control language having a high frequency of appearance is preferentially decided. Thus, even when it is impossible to discriminate mutually similar control languages within a group, since the determination can be based on the criteria, it is possible to reduce the possibility of erroneous determination.

The above and other objects, features and advantages of the present invention will become more apparent from the following detailed description of the invention when read in conjunction with the accompanying drawings.

BRIEF DESCRIPTION OF THE DRAWINGS

FIG. 6 is a functional block diagram of the image recording apparatus in the printer-language fixed mode;

FIGS. 11A and 11B are flowcharts illustrating the flow of processing by the automatic determination parser;

FIGS. 15A and 15B are flowcharts illustrating the flow of a determining rule for the language A determining device 84 in accordance with a second embodiment; and FIGS. 16A and 16B are flowcharts illustrating the flow of a determining rule for the language C determining device 88 in accordance with the second embodiment.

DESCRIPTION OF THE PREFERRED EMBODIMENTS

First Embodiment

Figure 1:
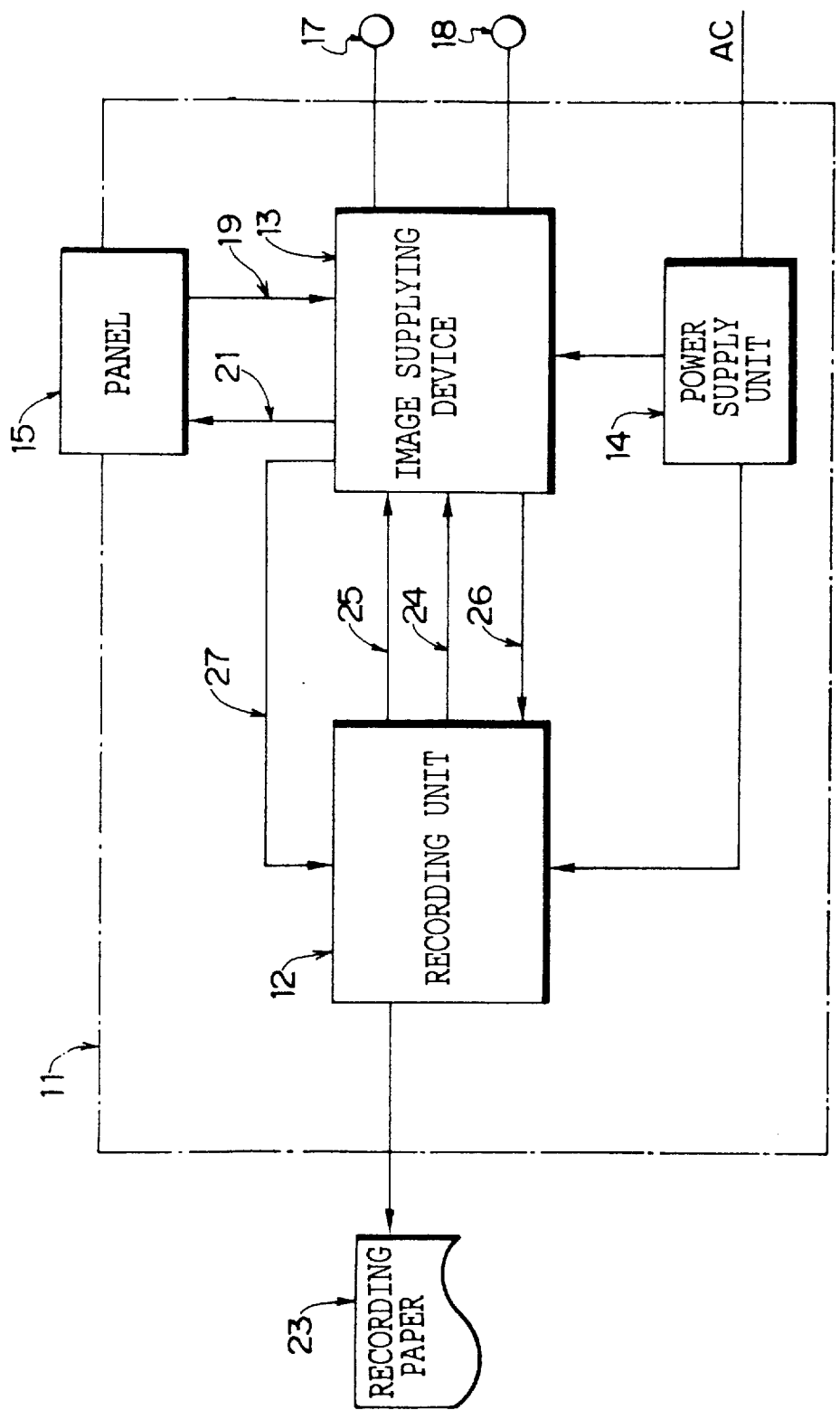
FIG. 1 is a block diagram illustrating a schematic configuration of an image recording apparatus in accordance with a first embodiment.

Referring now to the accompanying drawings, a detailed description will be given of an embodiment of the present invention. As shown in FIG. 1, an image recording apparatus 11 as an output device in accordance with the present invention is comprised of a recording unit 12 for recording an image, an image supplying device 13 for supplying image information to the recording unit 12, a power supply unit 14, and an operation panel 15 for entering instructions from the outside.

The recording unit 12 is constituted by, for example, a laser printer, and prints and outputs (records an image) onto recording paper 23 image information 27 supplied from the image supplying device 13 on the basis of an operation command signal 26 from the image supplying device 13. To allow this image recording to be executed properly, the recording unit 12 sends to the image supplying device 13 a state signal 24 indicating the type of recording paper 23 accommodated in an unillustrated cassette tray, whether or not the temperature of an unillustrated fixing unit has reached a fixing temperature, and so on. In addition, the recording unit 12 sends to the image supplying device 13 a synchronization pulse 25 for synchronization with the recording unit 12 in the transfer of image information.

A host interface terminal 17 and an input terminal 18 are electrically connected to the image supplying device 13. The host interface terminal 17 is a terminal for inputting print data from an unillustrated host interface, and the input terminal 18 is a terminal for inputting print data from an unillustrated network. The print data can be inputted through the two systems, i.e., via the host interface terminal 17 or the input terminal 18. Incidentally, a plurality of apparatuses on the network may be electrically connected to the input terminal as sources of supplying print data.

On the basis of the state signal 24 and the synchronization pulse 25 sent from the recording unit 12, the image supplying device 13 issues the operation command signal 26 to operate the recording unit 12, and sends the print data inputted from the host interface terminal 17 or the input terminal to the recording unit 12 as the image information 27, so as to control the image recording.

The operation panel 15 is comprised of an input section, including a key and switches, as well as a display section constituted by a liquid-crystal display (LCD), a lightemitting diode (LED) or the like. The operation panel 15, when operated by an operator, sends necessary instruction information 19 concerning recording to the image supplying device 13. In addition, the operation panel 15 displays response information 21 returned from the image supplying device 13 which received the instruction information 19.

The power supply unit 14 converts a commercial power supply (AC) into a predetermined direct current or an alternating current, and supplies electric power to the recording unit 12 and the image supplying device 13.

Figure 2:
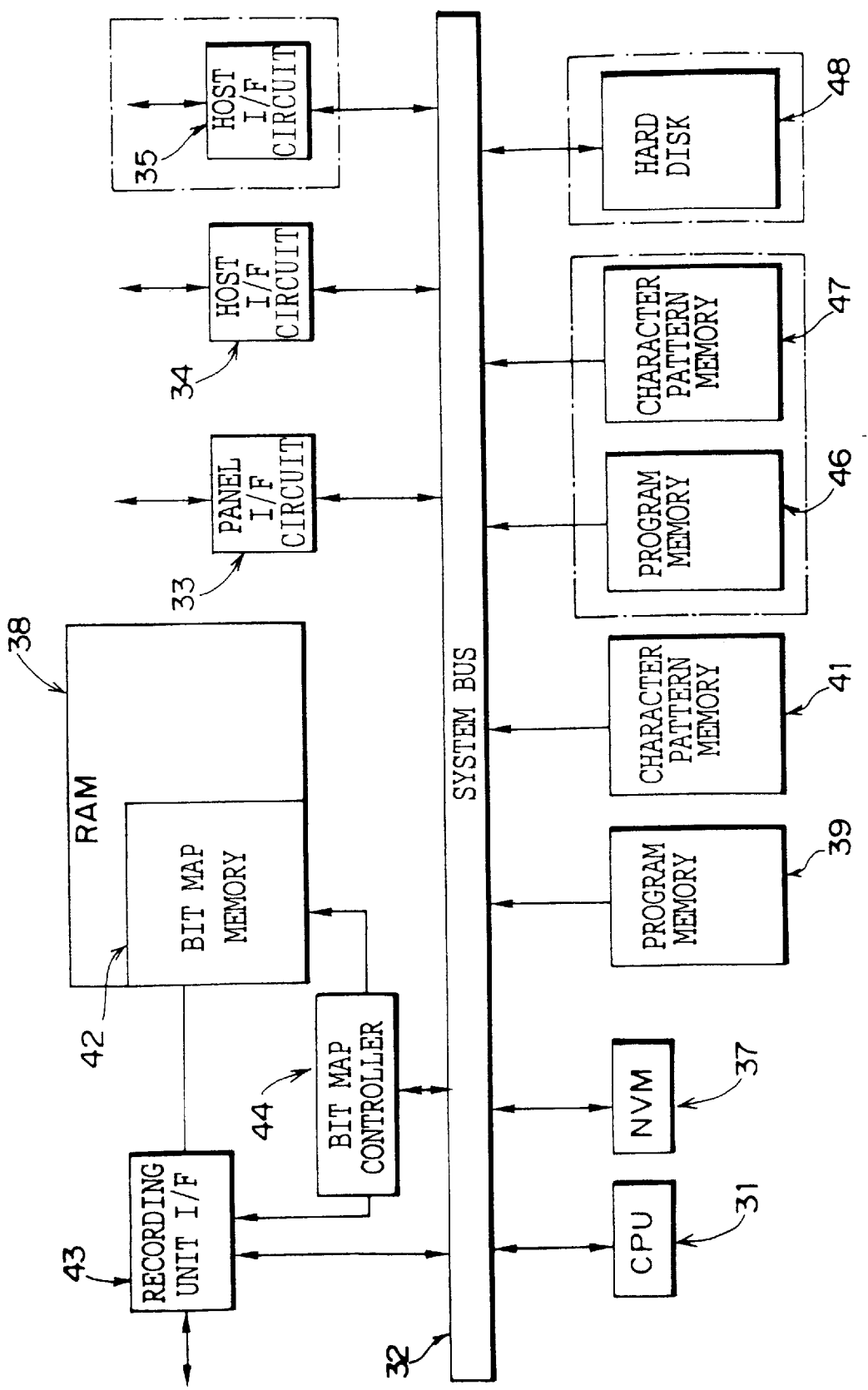
FIG. 2 is a circuit diagram of the image recording apparatus in accordance with the first embodiment.

As shown in FIG. 2, the image supplying device 13 has a central processing unit (CPU) 31 playing a central role in various kinds of control and electrically connected to a system bus 32. A panel interface (I/F) circuit 33 and a host I/F circuit 34 are connected to the system bus 32.

The panel I/F circuit 33 is a circuit for establishing an interface with the operation panel 15, and if the operator operates keys on the operation panel 15, a signal corresponding thereto is outputted from the operation panel 15, and is transferred on the system bus 32 via the panel I/F circuit 33. In addition, the display information of the system bus 32 is transferred to the operation panel 15 via the panel I/F circuit 33, and is displayed.

The host I/F circuit 34 is a circuit for establishing an interface with a higher level apparatus, such as a host computer, and is constituted by a circuit for receiving print data inputted from, for example, the host computer in conformity with the RS232C standard or the Centronics standard.

Further, the image supplying device 13 may be provided with a plurality of host interface terminals, and a host I/F circuit 35 may be additionally installed in correspondence with a necessary host interface. As installable interfaces, it is possible to cite, for example, the Centronics interface, Ethernet, and the like. This makes it possible to input print data from a plurality of interfaces.

Additionally, the following are connected to the system bus 32: a nonvolatile memory (NVM) 37, a RAM 38, a program memory 39, a character pattern memory 41, a recording unit I/F circuit 43, and a bit map controller 44.

The NVM 37 is a memory which is backed up by an unillustrated battery, and is capable of storing necessary data even if the power supply of the image recording apparatus 11 itself is turned off.

The RAM 38 is a working memory for the CPU 31, and retains data necessary for effecting various kinds of control of the image recording apparatus 11. The RAM 38 also functions as a receiving buffer for temporarily retaining print data inputted from the host I/F circuit or the host I/F circuit 35. Incidentally, the RAM 38 includes a bit map memory 42 for storing bit data for effecting electronic editing by pasting a generated character pattern, image, or the like in correspondence with one page of recording paper.

The program memory 39 is a memory in which a program for effecting control of the image recording apparatus 11 by the CPU 31 is stored. Incidentally, the program stored in the program memory 39 is read by the CPU 31 when the power supply of the image recording apparatus 11 is turned on.

The character pattern memory 41 is a memory in which character patterns for printing out are stored, and this memory is the so-called font memory.

The recording unit I/F circuit 43 is a circuit for establishing an interface with the recording unit 12, supplies the bit data developed in the bit map memory 42 to the recording unit 12 as the image information 27, and plays the role of an interface for transmitting or receiving the state signal 24, the synchronization pulse 25, and the operation command signal 26.

The bit map controller 44 is a circuit for providing control concerning transfer of image information between the bit map memory 42 and the recording unit I/F circuit 43.

A program memory 46 and a character pattern memory 47 are memories for storing a program and character patterns in the same way as the program memory 39 and the character pattern memory 41, respectively, and are selectively connectable to the image recording apparatus 11 in response to the user's requirement. As the program memory 46 and the character pattern memory 47, it is possible to use a ROM or the like of a detachable IC card type or SIMM type. Consequently, it is possible to extensively cope with programs and character patterns in correspondence with print data and control data which are sent from various host computers.

A hard disk 48 is a magnetic recording device for storing large volumes of data, and is used for the addition of character patterns, storage of form data and logo data, storage of input data from the host computer, and so on. This hard disk 48 can also be connected by the user, as required.

Figure 3:
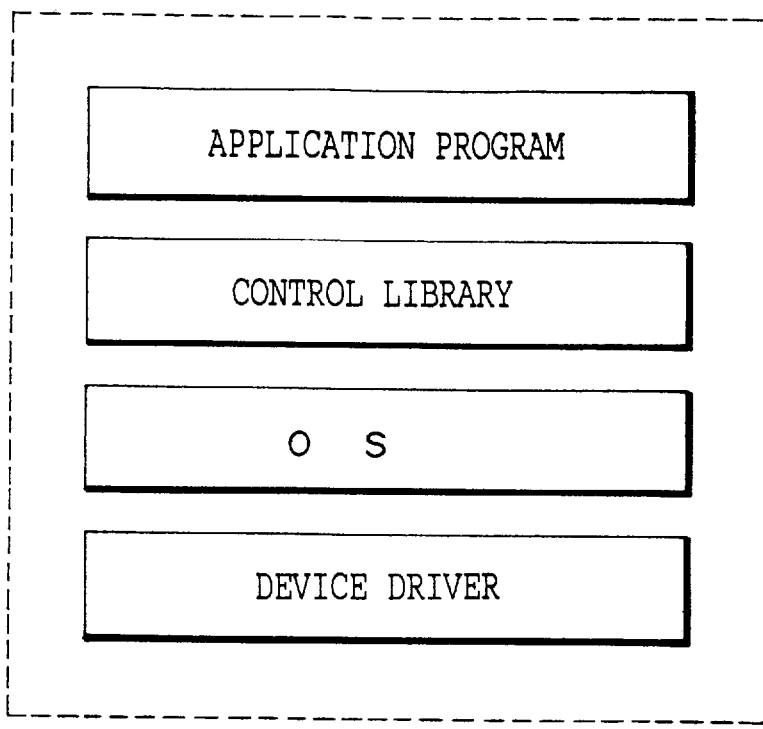
FIG. 3 is a diagram illustrating the structure of software of the image recording apparatus in accordance with the first embodiment.

Next, the structure of the program, i.e., software, stored in the program memory 39 is shown in FIG. 3. As shown in FIG. 3, a device driver, which is a software group for individually controlling various peripheral equipment, such as the hard disk 48, is located in a lowermost layer.

An operating system (OS) is located in the next layer, and plays a central role of software for controlling the image recording apparatus 11. This OS effects task management, storage management, input/output management, and the like to manages hardware including the CPU 31, the RAM 38, various peripheral equipment, and the like. The OS also manages logical resources, such as files and higher level programs, by performing file management, program management, communication control, and the like on the basis of the management of hardware resources. By adopting such a configuration, it is possible to minimize modifications of software in higher level layers due to a change in hardware.

A control library and an application program are located above the OS. A group of programs for control, which are used for the application program in the uppermost layer, are stored in the control library.

The application program is one which has been compiled to allow the image recording apparatus 11 to execute an operation desired by the user. A decomposer which interprets a printer language as a control language and develops the language into an image belongs to this application program.

Figure 4:
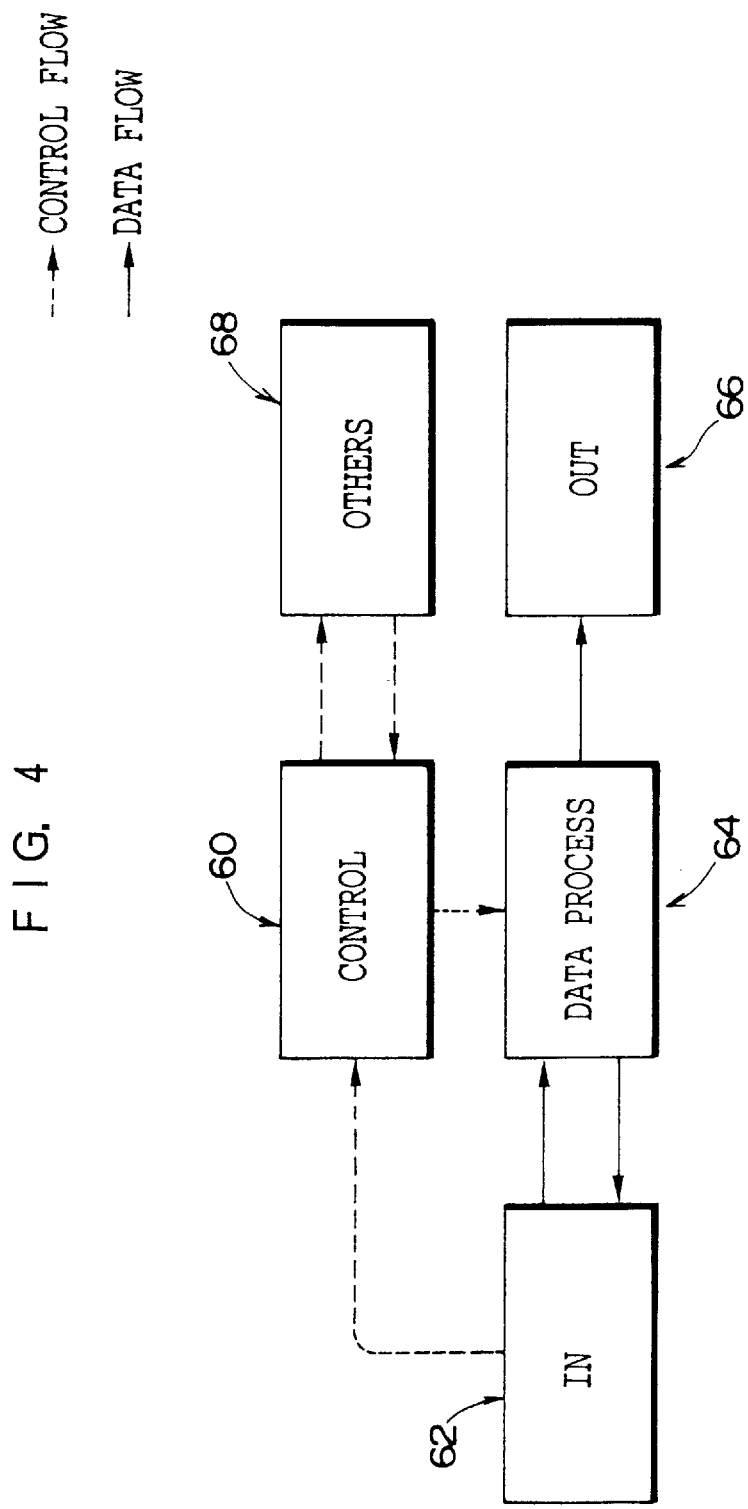
FIG. 4 is a block diagram of basic functions in an application program.

FIG. 4 shows a basic functional block diagram of an application program. Control 60 effects control of the overall system, and controls a data process 64 and others 68 on the basis of a request for a job start from in 62 and others 68.

This control 60 is comprised of modules (1) to (4) listed below. Incidentally, in this embodiment, the control 60 will be referred to as a system control unit.

(1) System controller: checks setting information and starts various tasks.
(2) Job controller: controls execution of jobs.
(3) Page controller: manages the bit map memory
(4) Timer controller: manages the timer based on a message The in 62 manages inputs and outputs of data with respect to the host computer. To conduct such inputs and outputs, the in 62 delivers data to and receives data from the data process 64. Further, on delivery of data or reception of data, the in 62 requests a job start to the control 60.

In addition, the in 62 is comprised of the following modules.

(1) Interface A: local interface A
(2) Interface B: local interface B
(3) Interface C: network interface C
(4) Interface D: network interface D
(5) Interface E: network interface E It should be noted that, as a local interface, it is possible to use Centronics, RS-232C, or the like, and as a network interface, it is possible to use Ethernet, LocalTalk, or the like.

The data process 64 processes data. The data to be processed is the data received from the in 62, and the processed result is delivered to the in 62 or out 66.

In addition, the data process 64 is an equivalent for a control-language interpreting portion which is stipulated in this embodiment, and will be referred to as a decomposer in this embodiment.

The decomposers are mounted as the data process 64, and include those kinds that are listed below. Each of these decomposers operates as one or more tasks.

(1) Automatic determination parser: a task for determining a printer language (control language)
(2) Language A decomposer: a task group for interpreting and executing a printer language A (a product-native page description language)
(3) Language B decomposer: a task group for interpreting and executing a printer language B (a page description language of an industrial standard)
(4) Language C decomposer: a task group for interpreting and executing a printer language C (a plotter control language developed by X corporation)
(5) Language D decomposer: a task group for interpreting and executing a printer language D (a wire-dot printer control language developed by Y corporation)
(6) Language E decomposer: a task group for interpreting and executing a printer language E (a wire-dot printer control language developed by Z corporation)
(7) Dump: a task for forming an image in a hexadecimal dump
(8) Print utility formatter task: a task for forming images of various print utilities The out 66 outputs data obtained as a result of processing by the data process 64. This out 66 is comprised of the following module.

(1) Engine controller: controls the printer engine (recording unit)

The others 68 executes various functions other than those described above and complex functions. The others 68 is comprised of the following modules.

(1) UI: controls the panel 15
(2) Print control agent: has functions for realizing a printer management system in a network. For example, its functions include the setting and provision of a printer resource and a state thereof with respect to a client.

As described above, an application program consists of a number of constituent elements, and each constituent element is comprised of a number of functional modules. In effect, these functional modules are comprised of one or more tasks. The decomposers also constitute a number of task groups.

These task groups employ various functions prepared for the control library, so as to synchronize the tasks. Also, the decomposers realize a printing function while synchronizing with the control 60 and the task groups constituting the in 62 and the out 66, by using the control library.

Next, a description will be given of the operation of the image recording apparatus 11. The print data outputted from information processors, such as various host computers and workstations, as well as control data constituted by a control language prescribing how the print data is to be outputted, are inputted to the image supplying device 13 via the host interface terminal 17 or the input terminal 18. Since there are many kinds of information processing apparatuses, the inputted control data are not necessarily uniform. For example, there are cases where although control data transmitted by a certain information processing apparatus may be able to provide detailed specifications on the sizes of the recording paper, the sizes of characters, and the like, control data of other apparatuses are incapable of providing such specifications.

If there are no specifications in the control data as in the latter case, a display is given to that effect on the display section of the panel 15. Accordingly, if the operator keys in necessary data concerning the relevant recording, the instruction information 19 is transmitted to the image supplying device 13, thereby permitting control of the recording based on the instruction information 19.

Incidentally, even in the case where detailed specifications on the sizes of the recording paper, the sizes of characters, and the like are provided by the information processing apparatus as control data, it is possible to enter the instruction information 19 through the panel 15 by the key operation or the like. In such a case, priority may be always placed on the instruction on the information processing apparatus side, or priority may be placed on the input on the panel 15 side. Additionally, priority may be placed on the side which provided the instruction later in time.

Next, on the basis of the instruction information 19 and the state signal from the recording unit 12, the image supplying device 13 determines whether or not printing is possible, and the result of determination is displayed on the panel 15 as the response information 21. For instance, if the paper of the size designated by the instruction information 19 has not been set in the recording unit 12, a response prompting the setting of the paper of that size is displayed on the panel 15.

When the preparations for recording have been provided as described above, the image supplying device 13 sends the operation command signal 26 to the recording unit 12 to operate the recording unit 12 on the basis of the control data, and transfers the inputted print data to the recording unit 12 as the image information 27 while providing output timing by means of the synchronization pulse 25 from the recording unit 12.

Next, a description will be given of the overall operation of the application program, particularly the operation of the decomposers each of which is started at a job start. Each of the decomposers which is started at a job start is the decomposer of the printer language (control language) set for each input port. If the control language set for the input port of the job designates automatic determination, the automatic determination parser is started (automatic determination mode), and if the automatic determination has not been designated, the decomposer of the control language which has been set is started (printer-language fixed mode). Here, a description will be given of processing by the decomposers in these two cases, respectively. Incidentally, the decomposers that are used are those for the aforementioned languages A, B, C, and D, as well as the dump.

Figure 5:
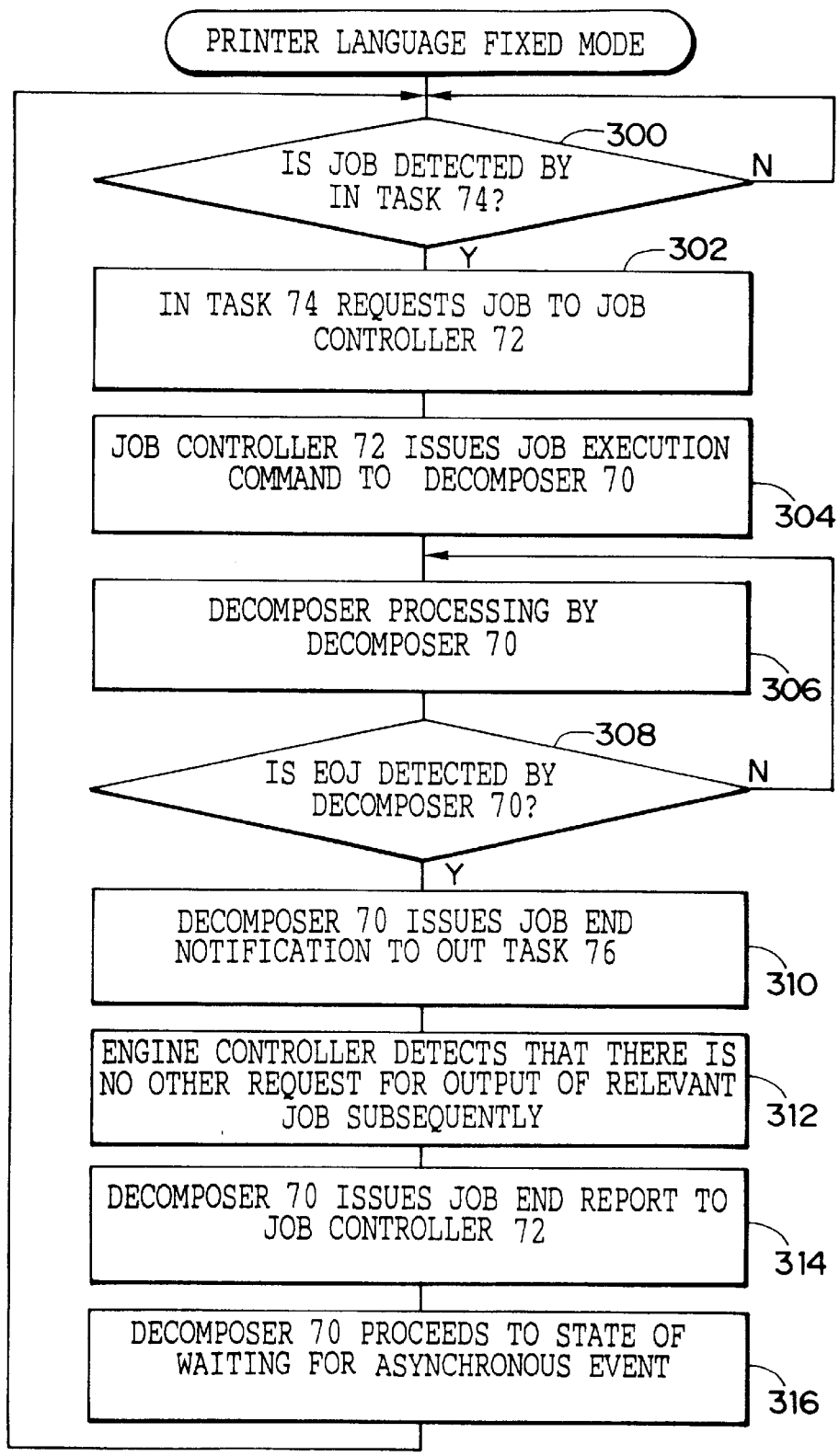
FIG. 5 is a flowchart illustrating the flow of processing in the image recording apparatus in a printer-language fixed mode.

First, referring to the flowchart shown in FIG. 5 and the block diagram shown in FIG. 6, a description will be given of processing in the printer-language fixed mode. In FIG. 6, an in task 74 is a task executed by the in 62; an out task 76 is a task executed by the out 66; a job controller 72 is one functional module of the aforementioned control 60; and a decomposer 70 is one decomposer for executing the relevant job.

The in task 74 determines whether or not a job has been detected (Step 300), and if NO is the answer in the determination, the wait state of the decomposer 70 is maintained until a job is detected. If a job is detected, the in task 74 refers to the printer language setting of the relevant input port, and requests a job to the job controller 72 as a job of the corresponding decomposer (Step 302). Incidentally, the detection of the job means that a series of data are inputted to an interface.

The job controller (system control unit) 72 receives the job request from the in task 74, and outputs a job execution command to the decomposer 70 (Step 304).

The decomposer 70 which has received the job execution command as an asynchronous event starts decomposer processing (Step 306). Through the decomposer processing by the decomposer 70, the printer language in the receiving buffer (RAM 38) received from the in task 74 is interpreted into the set printer language.

While the decomposer 70 is reading the printer language in the receiving buffer, a determination is made as to whether or not EOJ indicating an end of data has been detected (Step 308). If EOJ is not detected, the decomposer processing (Step 306) is continued, and if EOJ is detected, the decomposer 70 effects end processing of the job. It should be noted that EOJ can be determined by detecting an input of data indicating a job end, a time-out of the data input wait time, an input of an ejection command from the panel 15, an end of a file, an end of a network connection, and so on.

As job end processing, the decomposer 70 first gives a job end notification to the out task 76 (Step 310). Consequently, the engine controller is capable of detecting that there is no other request for the output of the relevant job subsequent to the relevant processing data (Step 312), so that the preparations for an output end are possible.

Then, the decomposer 70 issues a job end report to the job controller 72 (Step 314).

After completion of decomposer processing in the above-described manner, the decomposer 70 proceeds to a state of waiting for an asynchronous event (Step 316), and waits for a command for execution of new decomposer processing (304).

Figure 7A:
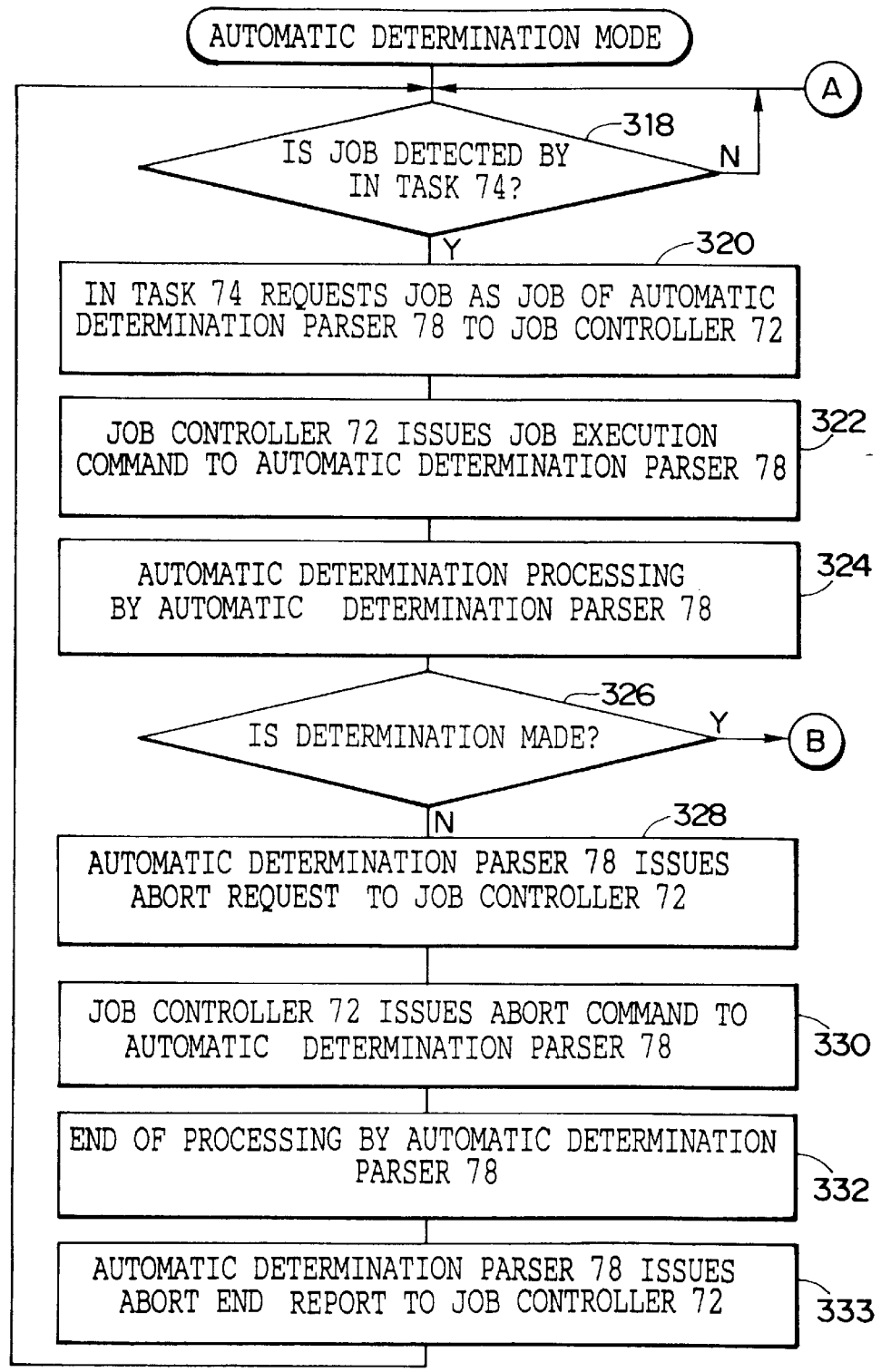
FIGS. 7A and 7B are flowcharts illustrating the flow of processing in the image recording apparatus in an automatic determination mode.
Figure 7B:
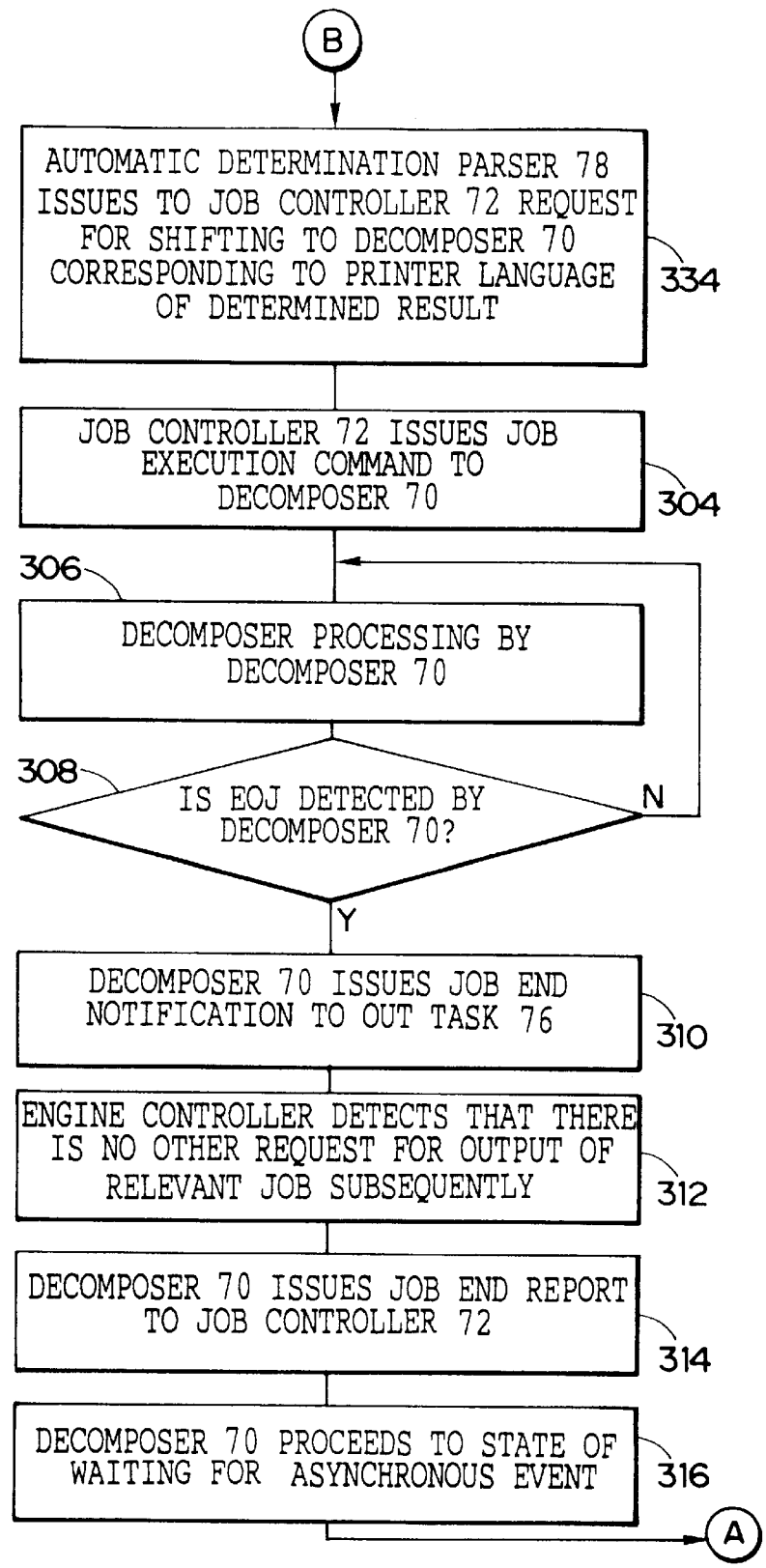
Figure 8:
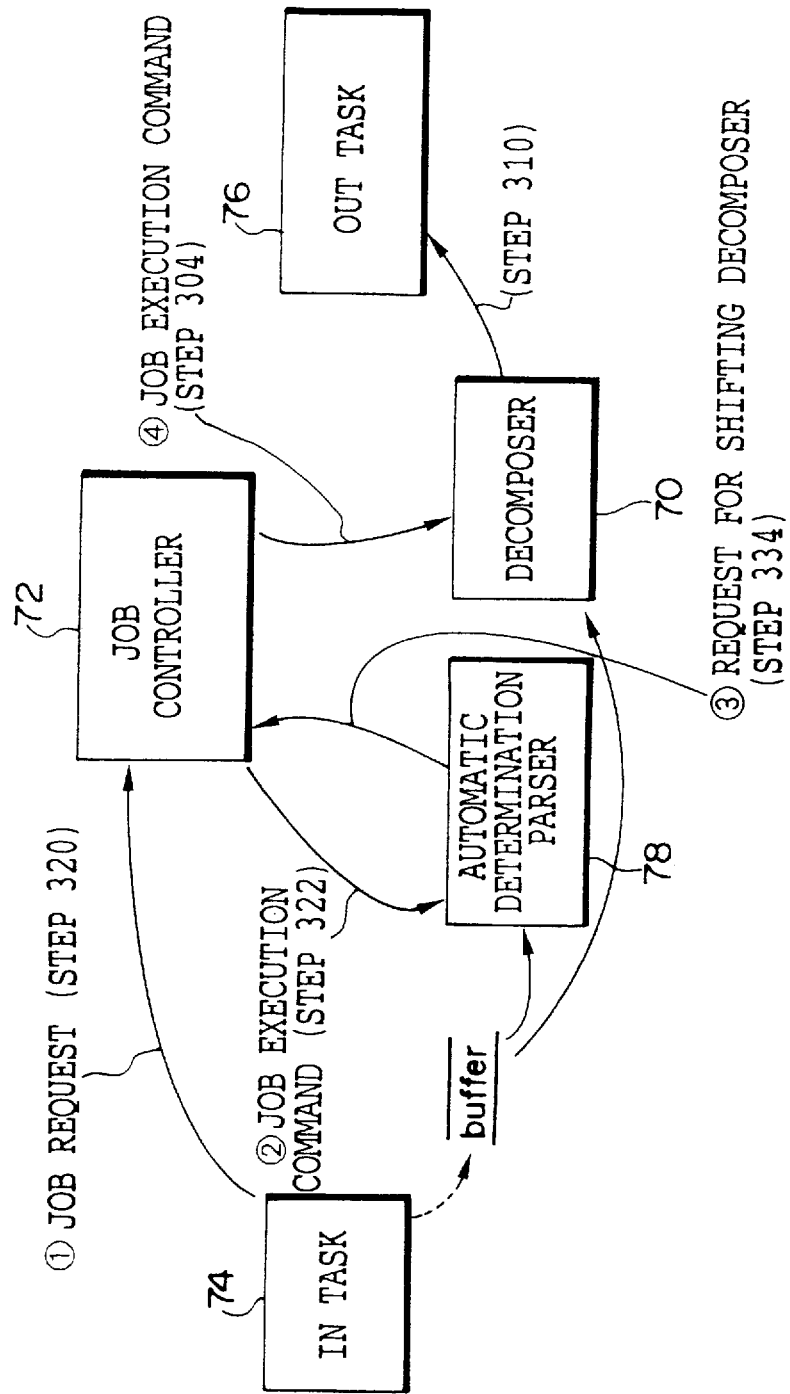
FIG. 8 is a functional block diagram of the image recording apparatus which operated properly in the automatic determination mode.
Figure 9:
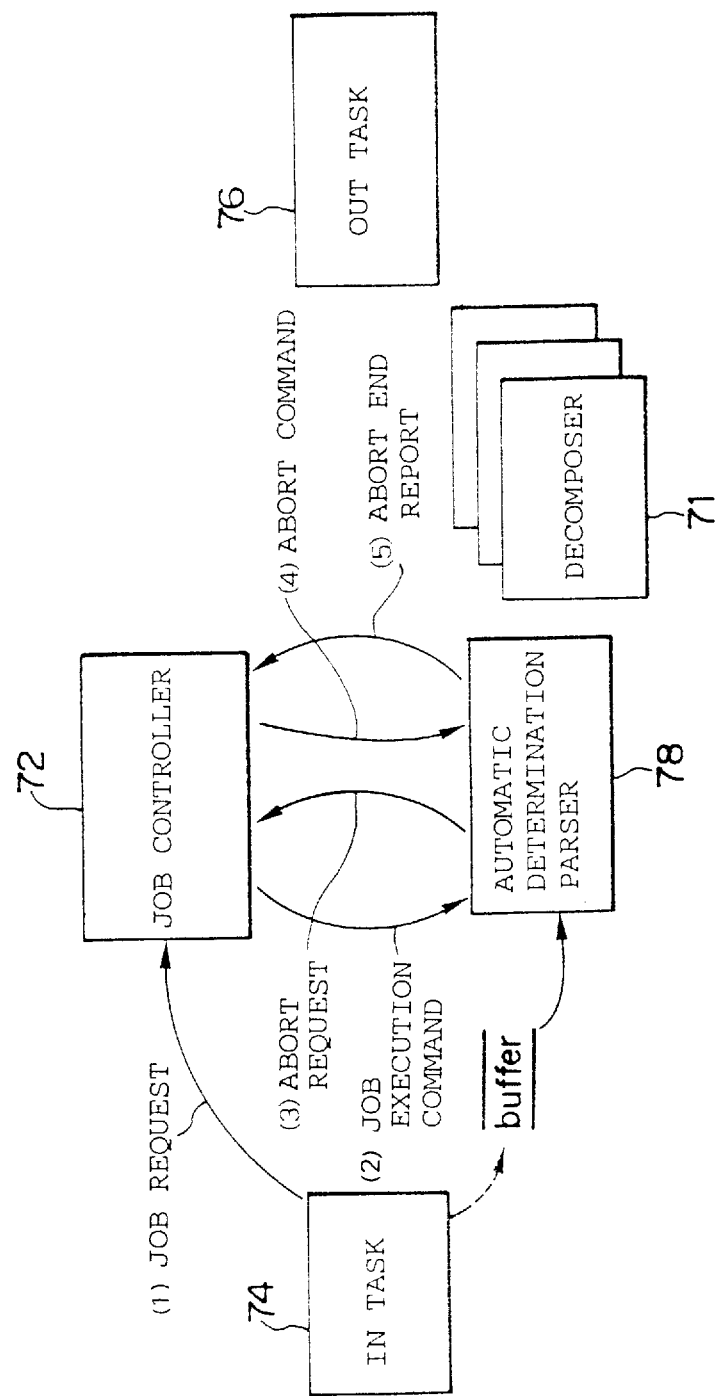
FIG. 9 is a functional block diagram of the image recording apparatus in a case where an abort request has been issued in the automatic determination mode.

Next, a description will be given of processing in the automatic determination mode with reference to flowcharts shown in FIGS. 7A and 7B as well as FIGS. 8 and 9 illustrating the functional blocks and the flow of control appearing in the flowcharts. Incidentally, FIG. 8 shows the case in which an automatic determination can be made, and FIG. 9 shows the case in which an automatic determination cannot be made. An automatic determination parser 78 which is newly added is a printer-language determining task which is mounted as the data process 64.

First, a determination is made as to whether or not the in task 74 has detected a job (Step 318). If NO is the answer in the determination, the wait state of the decomposer 70 is maintained until a job is detected. If a job is detected, the in task 74 issues a job request to the job controller 72 as a job of the automatic determination parser 78 (Step 320).

The job controller 72 which has received the job request issues a job execution command to the automatic determination parser 78 (Step 322).

When one of the conditions (1) and (2) below has been met, the automatic determination parser 78 which has received the job execution command executes automatic determination processing with respect to a predetermined volume of data received or data up to the detection of EOJ (Step 324).

(1) if a predetermined volume of data has been received
(2) if EOJ has been received A detailed description will be given of this automatic determination processing.

Upon completion of automatic determination processing by the automatic determination parser 78, a determination is made as to whether or not it has been possible to determine which printer language has been inputted (Step 326). If it has been possible to determine which printer language has been inputted, the automatic determination parser 78 issues to the job controller 72 a request for shifting to the decomposer 70 corresponding to the printer language of the result of determination (334). The job controller 72, in turn, issues a job execution command to the decomposer 70 so as to start the decomposer 70 (Step 304). Subsequently, control shifts to the decomposer 70, and the steps including Step 304 are the same as those in the printer fixed mode in FIG. 5, so that portions corresponding to FIG. 5 will be denoted by the same reference numerals, and a description thereof will be omitted.

Incidentally, a determination as to whether a decomposer of the printer language determined by the automatic determination parser 78 is mounted as optional software, as well as the handling thereof, are effected not by the automatic determination parser 78 but by the job controller 72.

Meanwhile, if in Step 326 it has not been possible to determine which printer language has been inputted, the automatic determination parser 78 issues an abort request to the job controller 72 (Step 328). Incidentally, at this time, the fact that it was impossible to determine the print language is registered in a print log.

The job controller 72 which has received the abort request issues an abort request to the automatic determination parser 78 (Step 330). As a result, processing by the automatic determination parser 78 ends (Step 332). Namely, a decomposer 71 proceeds to the state of waiting for an asynchronous event (see FIG. 9). Incidentally, since the decomposer which has been freed at this time does not refer to a specific one, and there are a plurality of such decomposers, the decomposer is designated as the decomposer 71 in FIG. 9, and is discriminated from the single decomposer 70.

After completion of processing, the automatic determination parser 78 issues an abort end report to the job controller 72 (Step 333), thereby ending the automatic determination processing, and the operation returns to the initial Step 318. It should be noted that since an output request to the out task 76 has not yet been made at this point of time, unlike the case in which a determination has been possible, a job end is not notified to the out task 76 (see FIG. 9).

If the above-described automatic determination mode is used, it is possible to automatically discriminate in which printer language the data received from a host computer has been written. Hence, even if the user does not designate the printer language, the image recording apparatus 11 is capable of effecting print processing by selecting an appropriate printer language processing system in correspondence with the received data.

Figure 10:
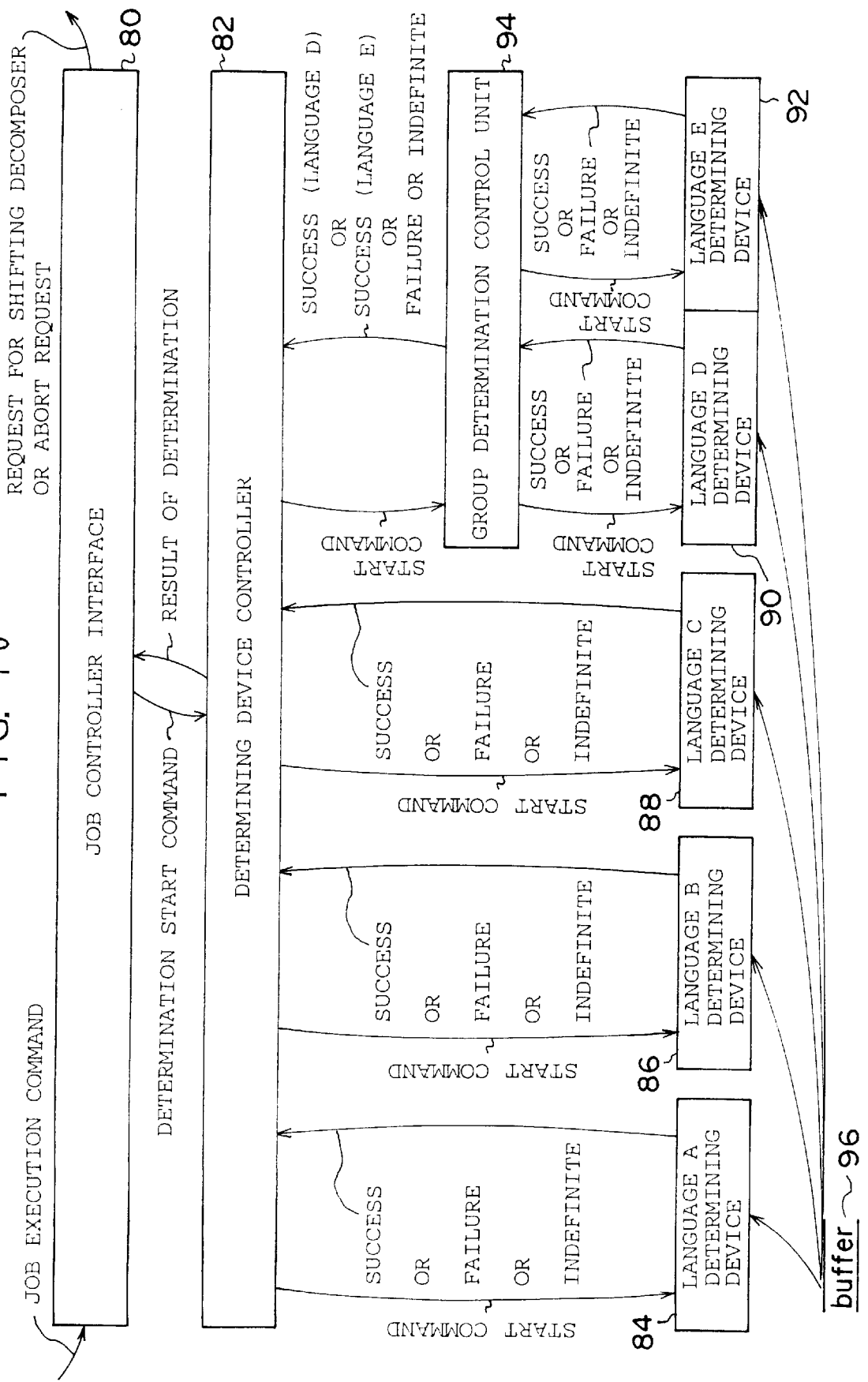
FIG. 10 is a block diagram illustrating the configuration of an automatic determination parser.

Next, a description will be given of an internal configuration of the above-described automatic determination parser 78 and the flow of control in details. As shown in FIG. 10, the automatic determination parser 78 is provided with a job controller interface 80 for establishing an interface with the job controller 72.

The job controller interface 80 imparts a determination start command to a determining device controller 82 on the basis of the job execution command, and receives the result of determination sent thereto from the determining device controller 82. In addition, the job controller interface 80 receives the job execution command from the job controller 72, and issues a decomposer shift request and an abort request to the job controller 72.

On the basis of the determination start command from the job controller interface 80, the determining device controller 82 imparts a start command to each of the determining devices for determining whether the received data is written in a particular printer language. Meanwhile, the determining device controller 82 receives the result of determination (success, failure, or indefinite) from each determining device.

In this embodiment, five determining devices are provided, including a language A determining device 84, a language B determining device 86, a language C determining device 88, a language D determining device 90, and a language E determining device 92 so as to determine whether the received data is written in a language A, a language B, a language C, a language D, or a language E, respectively.

The language A determining device 84, the language B determining device 86, and the language C determining device 88 are electrically connected directly to the determining device controller 82, and determine their subject printer languages on receipt of a start command from the determining device controller 82, and send the results of determination to the determining device controller 82, respectively.

The language D determining device 90 and the language E determining device 92 are electrically connected to the determining device controller 82 via a group determination control unit 94, and determine their subject printer languages on receipt of a start command inputted thereto from the group determination control unit 94, and send the results of determination to the determining device controller 82 via the group determination control unit 94, respectively.

One criterion as to whether or not the determining devices are configured as one group is that the subject printer languages have mutually common commands, and if the determining devices have common commands, they are configured as one group.

In addition, these determining devices are connected to a buffer 96, are adapted to read the received data stored in the buffer, and use the data as objects of determination. This buffer 96 is a local memory, and the received data stored therein has been transferred from the receiving buffer (RAM 38 in FIG. 2).

The respective determining devices consecutively read the received data amounting to a predetermined number of bytes, and effect retrieval to check whether there are commands used in the languages subject to determination by the respective determining devices. In addition, the determining devices also effect retrieval to check whether there are grammatical errors by assuming that the received data are written in the languages which are objects of determination by the respective determining devices. Then, the determining devices output one of the following "success," "indefinite," and "failure" as the result of determination on the basis of the combination of two kinds of results of retrieval as to "whether there is a command" and "whether there is a grammatical error."

"Success": "There is no grammatical error" and "there is a command"

"Indefinite": "There is no grammatical error" and "there is no command"

"Failure": "There is a grammatical error"

In the case of "success," the printer language of the received data is the language subject to retrieval by the relevant determining device. In the case of "indefinite," it means that it is uncertain whether the printer language of the received data is the relevant language, and in the case of "failure," it means that the printer language of the received data is not the relevant language.

By defining the results of determination in the above-described manner, it becomes possible to stop the determination processing by the determining device when "grammatical error" is detected. Consequently, it is possible to minimize the determination processing for irrelevant control languages, thereby making it possible to increase the speed of determination processing.

In addition, by detecting the "grammatical error," it is possible to prevent an erroneous determination even in cases where a command of another control language happens to be included as a character string, so that the determination accuracy can be improved.

It should be noted that the "grammatical error" means that an inconsistency as the control language has been detected, and is detected as follows. Namely, each determining device outputs the result of determination, "grammatical error," upon detecting a command code which is unlikely used in the control language subject to determination by that determining device or a combination of command codes which is unlikely used in the control language among control languages for describing received data. Further, a case where a certain particular command code is located at a particular position in a data string, and a case where although the sequence of command codes is preset in the control language, the command code is not present at a relevant position, also fall under the category of the "grammatical error."

Figure 11B:
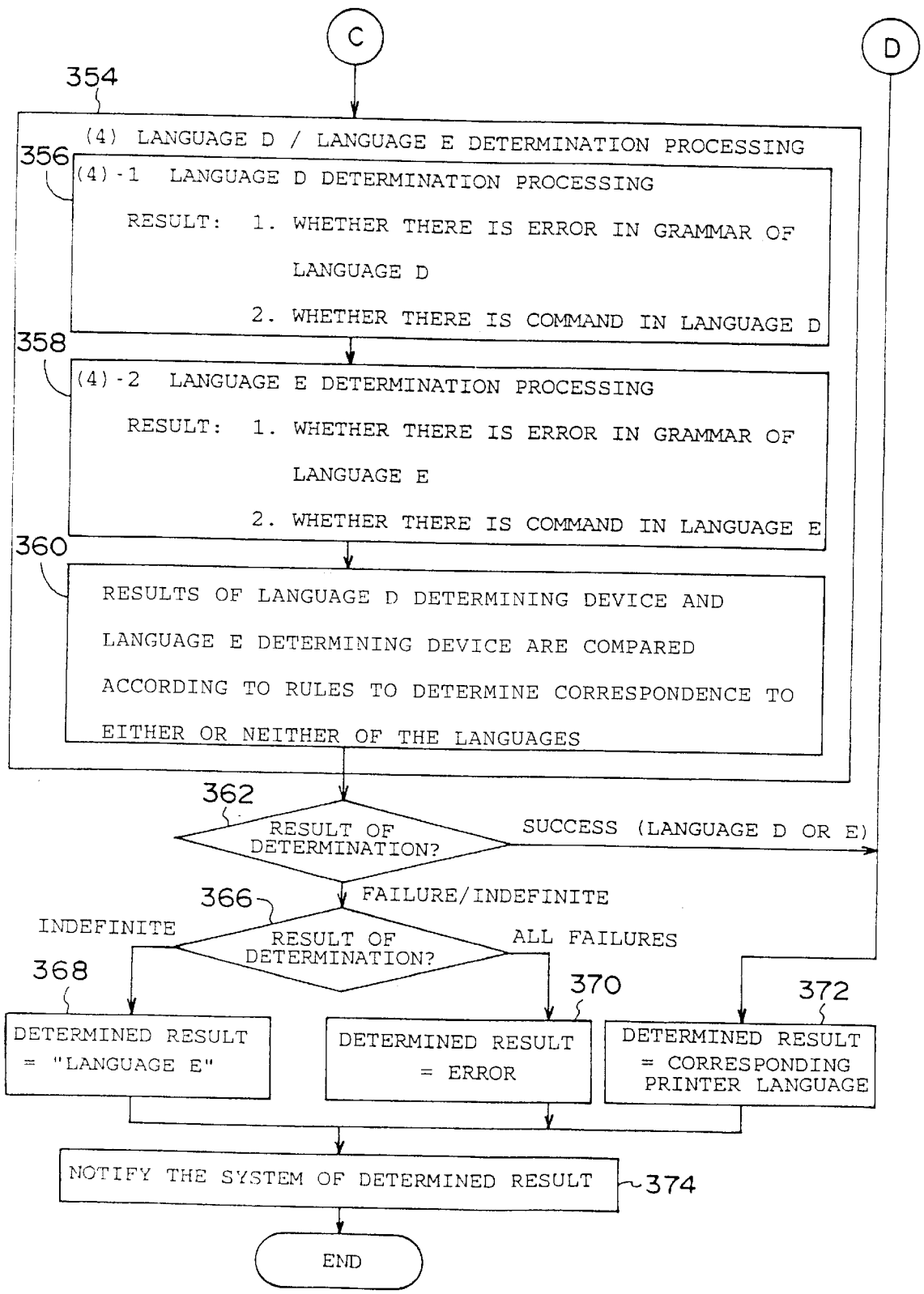

Next, referring to the flowcharts shown in FIGS. 11A and 11B, a description will be given of the flow of processing by the automatic determination parser 78.

When the received data is stored in the receiving buffer (RAM 38) by a fixed volume or more, a predetermined volume of the received data, e.g., 256 bytes or 1024 bytes of received data, is transferred to the buffer 96 which is a local memory (Step 340). However, if EOJ indicating an end of the received data is detected before reaching the predetermined volume, the received data up to EOJ is transferred (Step 340).

Then, if a job execution command is issued from the job controller 72 to the job controller interface 80, the job controller interface 80 imparts a determination start command to the determining device controller 82. Upon receiving the determination start command, the determining device controller 80 starts the determining devices consecutively by imparting a start command thereto.

First, the language A determining device 84 is started (Step 342) to carry out determination processing as to whether the received data in the buffer 96 is written in the language A. Upon completion of the determination processing, the result is sent to the determining device controller 82 to effect the determination of the result of determination (Step 344).

If the determination in Step 344 is "success," it is determined that the language A is the printer language of the received data (Step 372). Then, information that the language A is used as the result of determination is sent to the job controller interface 80, from which the result of determination is notified to the system (Step 374). Or a request for shifting to the decomposer for interpreting the language A is issued from the job controller interface 80 to the job controller 72.

If the determination in Step 344 is "failure" or "indefinite," the ensuing language B determining device 86 is started (Step 346) to determine whether the received data in the buffer 96 is written in the language B.

If the determination (Step 348) of the result of that determination is "success," it is determined that the language B is the printer language of the received data, and processing similar to the one described above is executed.

If the determination in Step 348 is "failure" or "indefinite," the ensuing language C determining device 88 is started (Step 350) to determine whether the received data in the buffer 96 is written in the language C.

If the determination (Step 352) of the result of that determination is "success," it is determined that the language C is the printer language of the received data, and processing similar to the one described above is executed.

Thus, since the automatic determination processing is completed when one determining device has determined "success," it is unnecessary to perform determination processing for irrelevant control languages, thereby making it possible to increase the speed of determination processing.

However, if the determination in Step 352 is "failure" or "indefinite," the determining device controller 82 imparts a start command to the group determination control unit 94, which in turn executes language D/language E determination processing (Step 354). This language D/language E determination processing is comprised of the following steps.

First, determination processing as to whether the received data is written in the language D is carried out by the language D determining device 90 (Step 356), and the result of that determination is sent to the group determination control unit 94 and is held there temporarily. Next, determination processing as to whether the received data is written in the language E is carried out by the language E determining device 92 (Step 358), and the result of that determination is sent to the group determination control unit 94. The group determination control unit 94 compares the results of determination by the language D determining device 90 and the language E determining device 92 according to a rule, so as to determine correspondence to either or neither of the languages (Step 360). For example, if the determination concerning only one language is "success," and the determination concerning the other language is "failure" or "indefinite," the former language is decided as the result of determination. Meanwhile, in the case of "success" for both languages, the language D is decided as the result of determination, and in the case of "indefinite" for both languages, the language E is decided as the result of determination. Then, if the determination is "failure" for both languages, the result of determination is decided to be "failure," and if the determination is "indefinite" for one language and "failure" for the other language, the result of determination is decided as being "indefinite."

When the result of determination is issued, the group determination control unit 94 notifies the determining device controller 82 of the result of that determination as well as the type of language in the case of "success." Then, the result of that determination is determined (Step 362), and in the case of "success," either the language D or the language E is determined to be the printer language (Step 372), and the result is notified to the system (Step 374). Meanwhile, in the case of "failure" or "indefinite" in the determination in Step 362, a determination is made as to "all failures" or "indefinite" (Step 366). In the case of "all failures," the result of determination is decided as being "error" (Step 370), and in the case of "indefinite," the language is decided as the language E as the result of determination (Step 368), and the result is notified to the system (Step 374). This language is one of the wire-dot printer control languages as described above, and since it is a language which permits an output of simple text (character strings and combinations of commands such as return and line feed), such processing is possible.

Thus, control languages having mutually common commands are handled as one group, and with respect to the determination of control languages in the same group, the result of determination is outputted when all the determinations by the determining devices have been completed. Hence, it is possible to prevent an erroneous determination of the subject language being a control language in the same group. In addition, it is also possible to prevent an erroneous determination of the subject language being a control language not belonging to the group.

Further, even in the case of "indefinite" in which commands characterizing the printer language are not included and only data is present, printing becomes possible by applying an appropriate control language set according to a rule.

Incidentally, in the case where a plurality of determining devices in the same group outputted "success" in Step 360, the group determination control unit 94 may output the result of determination according to the following method.

First, command codes in individual control languages are classified into unique commands and common commands. As for the common commands, a weighted table is prepared for each determining device, and the weight which has been set for each determining device is added each time agreement with the command code of the inputted control language is obtained. Then, a final result of addition is used as auxiliary information for the result of determination "success." Namely, this is a method whereby after the results of addition for all the determining devices in the group are obtained, if there are a plurality of determining devices which detected "success," a determination as to which control language in the group the subject language corresponds is made on the basis of the relative magnitude of the result of addition by each determining device. Since the common commands vary in the meaning and importance in terms of control for each control language, so that this method makes it possible to discriminate the languages in the group, thereby enhancing the determination accuracy.

Further, it is also effective to adopt a method in which after priorities are provided in advance to the control languages within the group, and the results are obtained for all the determining devices in the group, the determining device which detected the inclusion of an inconsistent command code is excluded, and a determination as to which control language in the group the subject language corresponds is made according to the priority. This method is applicable to a case where the meaning of a common command (a group of commands) in terms of control is higher for a particular control language than the other control languages. Namely, if a plurality of determining devices detected "success" within the group, this means that common commands are included in the input data. Accordingly, if the meaning of the common command (a group of commands) in terms of control is more important for a particular control language than the other control languages, the priority can be considered as a measure of certainty.

According to this method, the classification of common commands, weight retrieval, and addition processing can be omitted, so that there is an advantage in that the processing time can be reduced as compared with the above-described method.

In addition, in the above-described example, the determining rule for determining the control languages entirely consists of the retrieval of the presence or absence of commands and the presence or absence of the inconsistency of command codes, but determining rules provided for the respective control languages may be used. A determining rule executed in each determining device is set as an optimum determining rule in the determination of the subject control language, and the determining rules can be different or identical depending on the kinds of control language. Consequently, it is possible to obtain an additional advantage in that the need for useless retrieval can be reduced, the processing time can be shortened, and the determination accuracy improves by the determining rule optically suited for the relevant control language.

Figure 12:
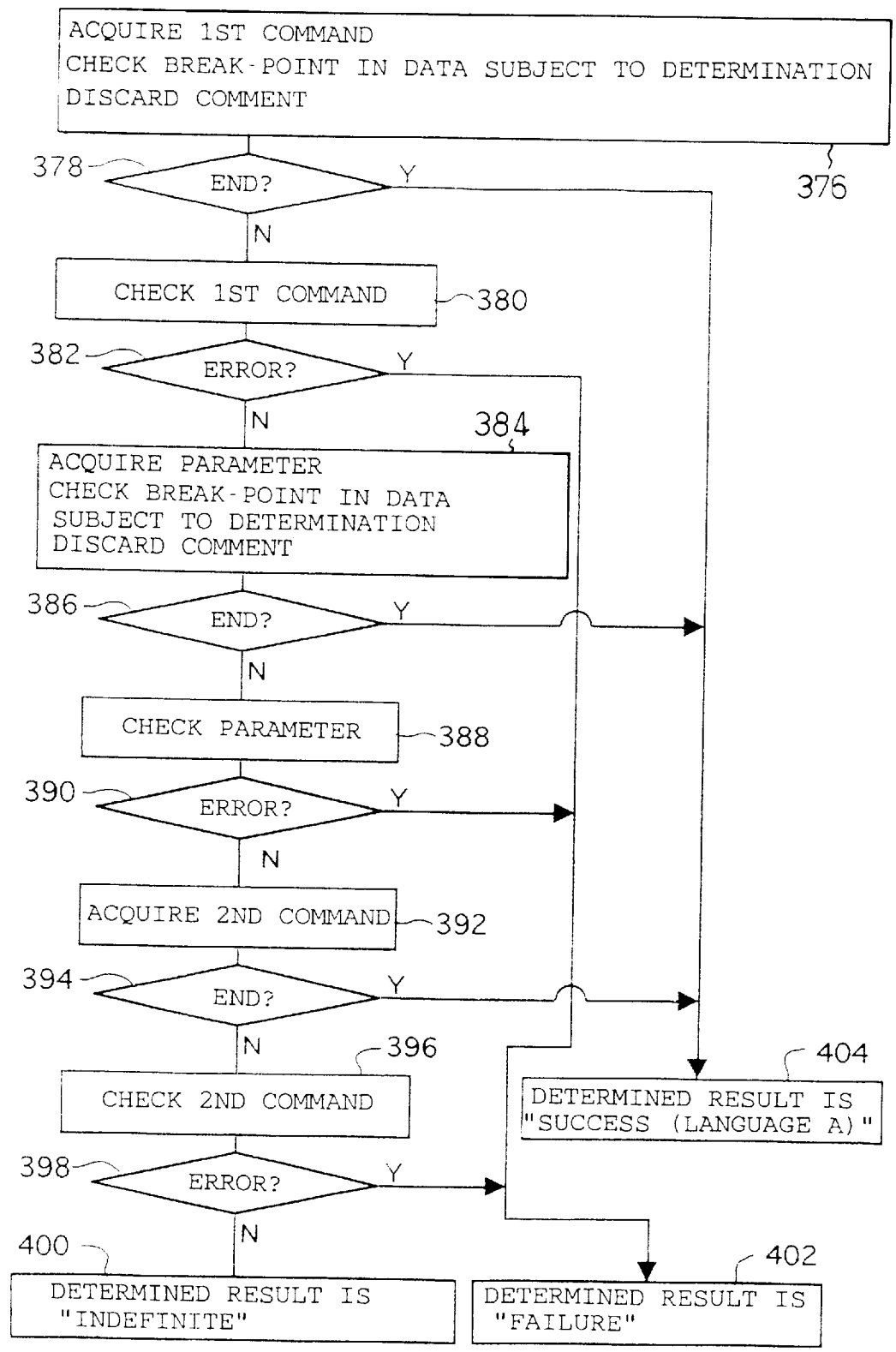
FIG. 12 is a flowchart illustrating the flow of a determining rule for a language A determining device 84.
Figure 13:
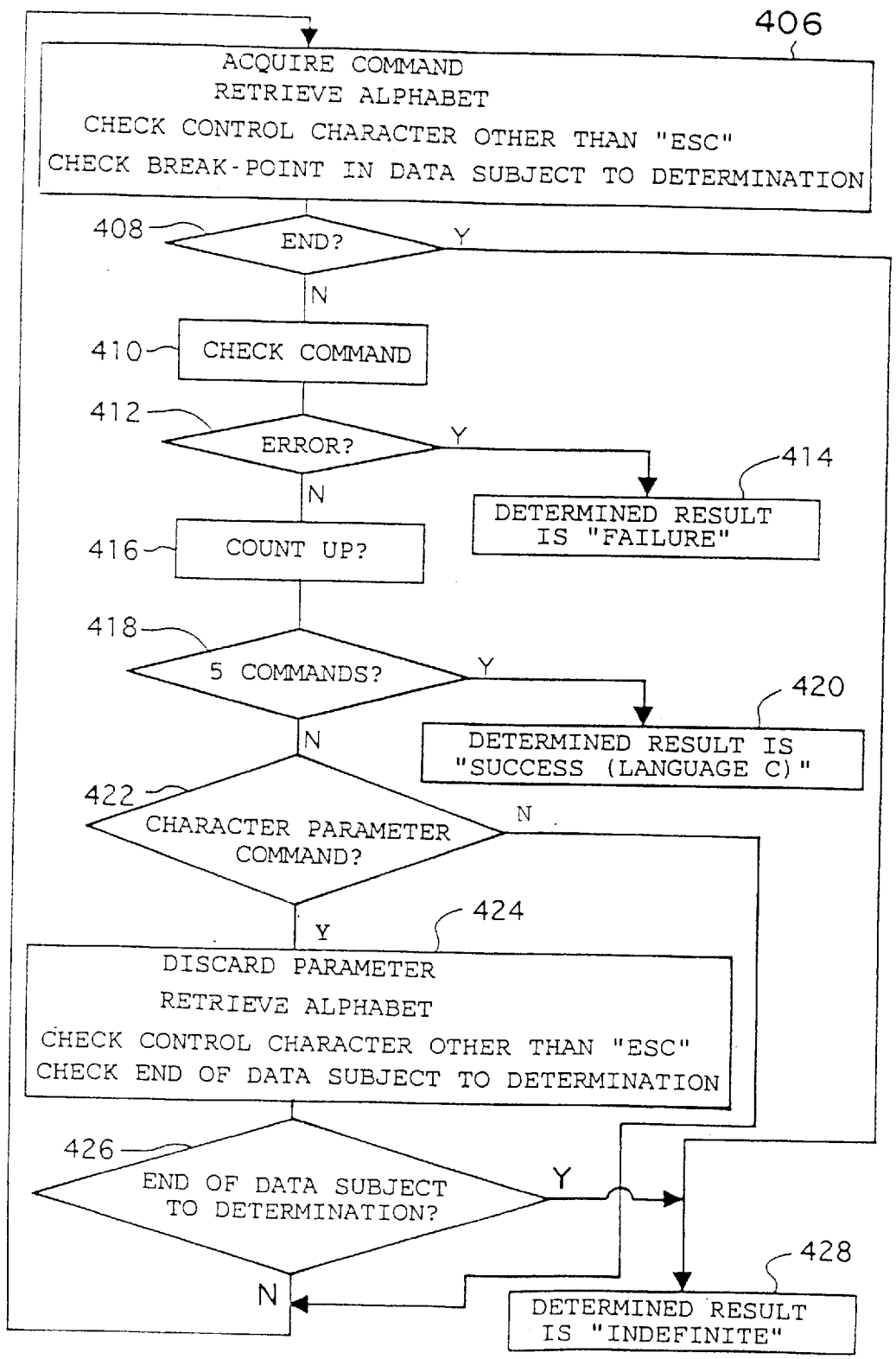
FIG. 13 is a flowchart illustrating the flow of a determining rule for a language C determining device 88.

An example of determining rules which differ among the control languages is shown in FIGS. 12 and 13.

The flowchart shown in FIG. 12 shows a determining rule for the language A determining device 84, and this determining rule specifies the language A by the order of appearance of commands. In the language A, commands which are received first and second are predetermined since the commands are received at different levels of layers called segments, so that the language can be specified by the order of appearance of the commands.

According to FIG. 12, a code constituting input data is first read, and a first command is acquired by checking a break-point of a command (a first stage in Step 376). At this time, a comment is discarded (a latter stage in Step 376).

Next, a check is made as to whether or not the data to be determined has ended (Step 378). If the data has ended, the result of determination is decided as being "indefinite" (Step 404), and the processing by the language A determining device 84 ends.

If the data has not ended, a check of the first command is conducted (Step 380), and a determination is made as to whether or not the command is proper as a command which should appear first in the data in the language A (Step 382).

If the result of the check of the first command is an error, the result of determination is decided to be a failure (Step 402), and the processing by the language A determining device 84 ends.

If the result of the check of the first command is proper, a parameter break-point check is conducted with respect to the code which has been read, so as to acquire the parameter (a first stage in Step 384). At this time as well, a comment is discarded (a latter stage in Step 384).

Next, a check is made as to whether the data to be determined has ended (Step 386). If the data has ended, the result of determination is decided as being "indefinite" (Step 404), and the processing by the language A determining device 84 ends.

If the data has not ended, a parameter check of the first command is conducted (Step 388), and a determination is made as to whether or not the parameter is proper as a parameter of the command which should appear first in the data in the language A (Step 390).

If the result of the parameter check is an error, the result of determination is decided to be a failure (Step 402), and the processing by the language A determining device 84 ends.

If the result of the parameter check is proper, a second command is acquired (Step 392). The method of acquisition of the second command is similar to that of the first command.

Next, a check is made as to whether or not the data to be determined has ended (Step 394). If the data has ended, the result of determination is decided as being "indefinite" (Step 404), and the processing by the language A determining device 84 ends.

If the data has not ended, a check of the second command is conducted (Step 396), and a determination is made as to whether or not the command is proper as a command which should appear second in the data in the language A (Step 398).

If the result of the check of the second command is an error, the result of determination is decided to be a failure (Step 402), and the processing by the language A determining device 84 ends.

If the command which should appear second is proper, the result of determination is decided as being "success," and the control language is considered as being the language A (Step 400).

As described above, in the case where the language is determined by the order of appearance of the commands, it is possible to avoid confusion with a case where a code identical to the relevant command happens to be provided as a data string. Hence, the determination accuracy improves remarkably as compared with the case in which only commands peculiar to the relevant language are retrieved. Moreover, as shown in FIG. 12, if the order or positions of appearance of the commands are different, the result of determination can be immediately decided as being "failure" at that point of time, and the processing concerning the relevant determining device can be ended, so that the processing time can be shortened.

Next, the flowchart in FIG. 13 shows a determining rule for the language C determining device 88. According to this determining rule, the language C is specified when the number of appearances of commands of the language C has reached a predetermined number.

According to FIG. 13, a command is first acquired (a first stage of Step 406). As for the method of acquiring the command, the alphabet is retrieved, and if the command is detected, the command and an ensuing byte are fetched. Namely, data in a two-byte unit is acquired from the data to be determined. Meanwhile, if the detected code is not the alphabet but an ESC (1Bh) code, confirmation is made that the next byte is (2Eh), and data up to still another byte is fetched. Accordingly, three bytes are acquired from the data subject to determination.

Next, a check is made as to whether or not the data to be determined has ended (Step 408). If the data has ended, the result of determination is decided as being "indefinite" (Step 428), and the processing by the language C determining device 88 ends.

If the data has not ended, a command check is conducted (Step 410), and a determination is made as to whether or not the command is proper as a command of the language C (Step 412).

If the result of the command check is an error, i.e., if the acquisition of the command has ended in an error or if it is determined that the acquired command is not that of the language C, the result of determination is decided to be a failure (Step 414), and the processing by the language C determining device 88 ends.

If the result of the command check is proper, the number of the commands is counted up (Step 416). Incidentally, the number of commands is cleared to zero at the start of the language C determining device 88.

Next, a determination is made as to whether or not the count of the number of commands has reached five (Step 418). If YES is the answer in the determination, i.e., if the count of the number of commands has reached five, the result of determination is decided as being "success," so that the control language is handled as the language C (Step 420).

If NO is the answer in the determination, a determination is made as to whether or not the command subjected to the command check is a command in which the characters are used as a parameter (Step 422). If the command is not a character parameter command, the operation returns to Step 406 to acquire an ensuing command from the data subject to determination, and similar processing is repeated until YES is given as the answer in the determination in Step 422.

If the command is a character parameter command, the character parameter is discarded so that the parameter will not be interpreted as a command in the command acquisition in Step 406 (Step 424).

In this parameter discard processing, a determination is made as to whether or not the data to be determined has ended (Step 426). If the data to be determined has ended, the result of determination is decided as being "indefinite," and the processing by the language C determining device 88 ends. If the data to be determined has not ended, the operation returns to Step 406 to acquire an ensuing command from the data subject to determination, and similar processing is repeated until YES is given as the answer in the determination in Step 426.

As described above, in the case where the language is determined by the number of appearances of commands, there is an advantage in that the determination accuracy improves as compared with a case in which only the presence or absence of commands peculiar to the relevant language is detected. In cases where such a determining rule is adopted, if the parameter discarding processing is carried out as shown in FIG. 13, it is possible to avoid confusion with a case where a code identical to the relevant command happens to be provided as a data string. Hence, it is possible to prevent a decline in the determination accuracy.

In addition, in a case where control languages, which are determined by the number of appearances of commands as described above, form a group, in the case of the aforementioned languages D and E, for example, the possibility of an erroneous determination becomes high if the two determinations are carried out separately. For instance, a command concerning which an error does not occur in the language E determining device 92 is present among the commands of the language D, so that it cannot be finally determined that the language is the language E unless a determination concerning the language D is performed.

Figure 14:
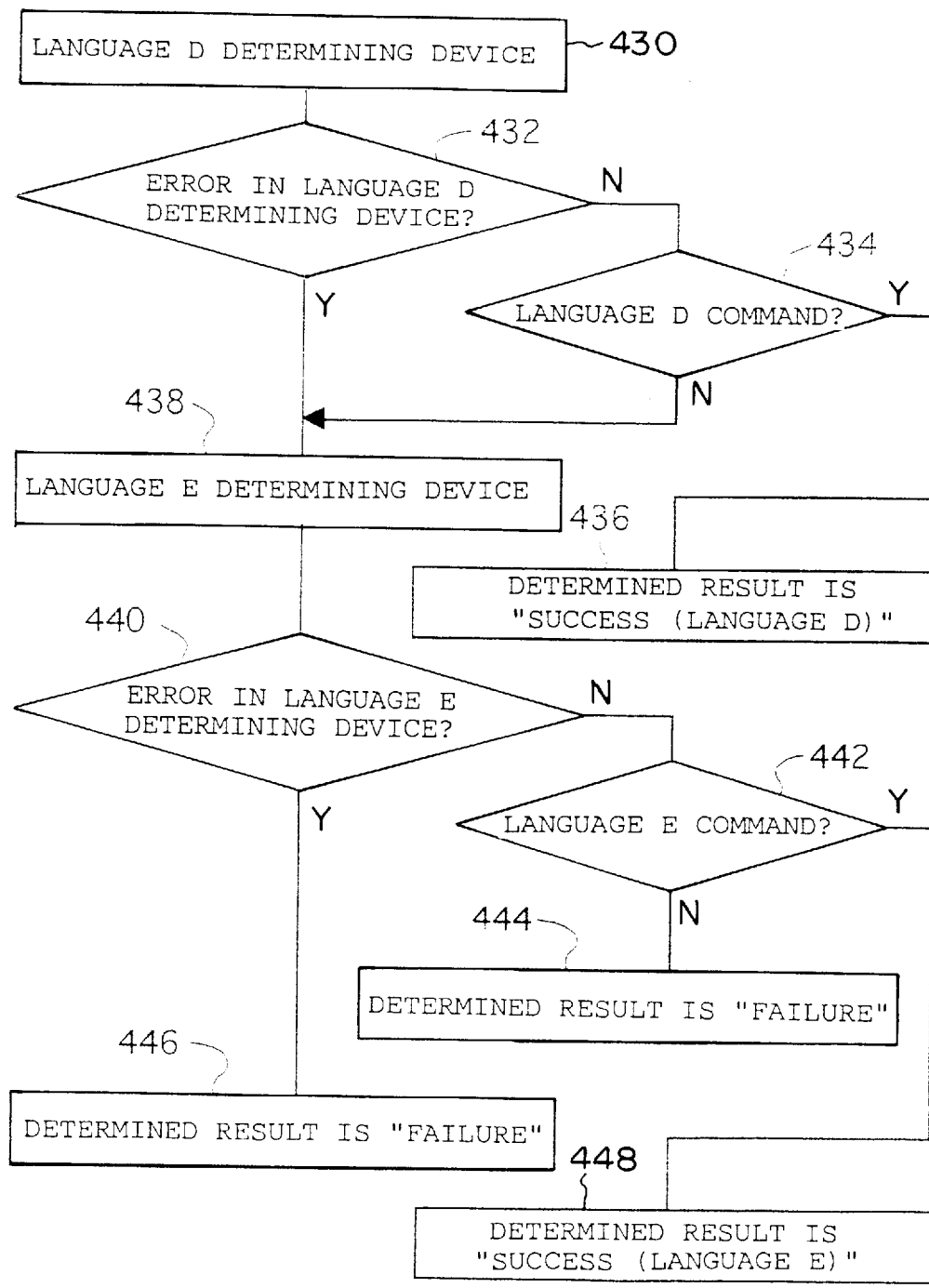
FIG. 14 is a flowchart illustrating the flow of a final determining rule for languages D and E constituting a group.

The flow of final determination processing in such a case of group determination is specifically shown in the flowchart in FIG. 14. Incidentally, processing by the language D determining device 90 and the language E determining device 92 involves only the command error check and the count of the number of commands.

According to FIG. 14, determination processing is first carried out by the language D determining device 90 as to whether or not the input data is written in the language D (Step 430). Upon completion of the processing, a determination is made as to whether or not the language D determining device 90 has ended due to an error (Step 432). In the case of the error end, the operation proceeds to determination processing by the ensuing language E determining device 92 (Step 438), and if it is not the error end, the presence or absence of a command peculiar to the language D is checked (Step 434).

If there is a command peculiar to the language D, the result of determination is decided to be "success," so that the control language is handled as being the language D (Step 436). On the other hand, if there is no command peculiar to the language D, the operation proceeds to determination processing by the ensuing language E determining device 92 (Step 438).

Then, determination processing is carried out by the language E determining device 92 as to whether or not the input data is written in the language E (Step 438). Upon completion of the processing, a determination is made as to whether or not the language E determining device 92 has ended due to an error (Step 440). In the case of the error end, the result of determination is decided to be "failure" (Step 446), and if it is not the error end, the presence or absence of a command peculiar to the language E is checked (Step 442).

If there is a command peculiar to the language E, the result of determination is decided to be "success," so that the control language is handled as being the language E (Step 448). On the other hand, if there is no command peculiar to the language E, the result of determination is decided to be "failure" (Step 444).

Thus, by making a final determination of the control languages belonging to a group, it is possible to avoid an erroneous determination within the group, thereby making it possible to enhance the determination accuracy.

Incidentally, in the case where a determining rule is provided for each determining device as described above, and the determination processing is ended when the "success" is outputted, if processing is conducted consecutively by determining devices consecutively in decreasing order of processing speed, this arrangement contributes to the shortening of the processing time. For instance, the method of checking the order of appearance of commands provides the fastest processing, then followed by the check of the number of commands, and the check of the presence or absence of unique commands. Therefore, if the start in the determining rule for each determining device is based on this order, since the processing time of the leading determining device or a determining device in the vicinity thereof, for which processing is repeated most frequently, is short, so that an average time for determination processing can be shortened.

In addition, the order of starting the determining devices may be invariable, but may be variable. For example, it is possible to cite a method in which the language which was determined immediately before is determined first, a method in which the results of determination of a particular language are counted in advance, and a determination is made starting with a language exhibiting a large count, a method in which the user designates the order of determination by means of a command of an operation panel, and other similar methods. If the order is thus made variable, it is possible to further shorten the processing time.

Second Embodiment

In the first embodiment, a description has been given of an example in which one determining rule is provided for each determining device, i.e., for each control language, but a plurality of determining rules may be applied to each determining device. This example will be described hereafter as a second embodiment. Incidentally, since the configuration of the printer apparatus and the configuration of software are similar to those of the first embodiment, identical portions will be denoted by identical reference numerals, and a description thereof will be omitted.

In the second embodiment, a plurality of determining rules are provided for each determining device. For example, the language A determining device 84 is provided with a determining rule whereby the language A is confirmed when the order of first and second commands in the data is correct, or when a particular command group has been detected in the language A. Accordingly, command groups, to which the determining rules are applied, differ with respect to determining rules, and constitute groups corresponding to the respective determining rules. For instance, in the case of the language A determining device 84, the command groups are classified as shown in Table 1.

It should be noted that each determining device has a function whereby the commands which have been read are classified into the respective groups according to the determining rule provided for each determining device.

TABLE 1

| Name of Group | Description of Classification |
| --- | --- |
| Group (1) | a group of commands which should be located at the first position in data |
| Group (2) | a group of commands which should be located at the second position in data |
| Group (3) | a group of commands which should be located confirmed instantly when detected |
| Group (4) | a group of other commands |

Figure 15A:
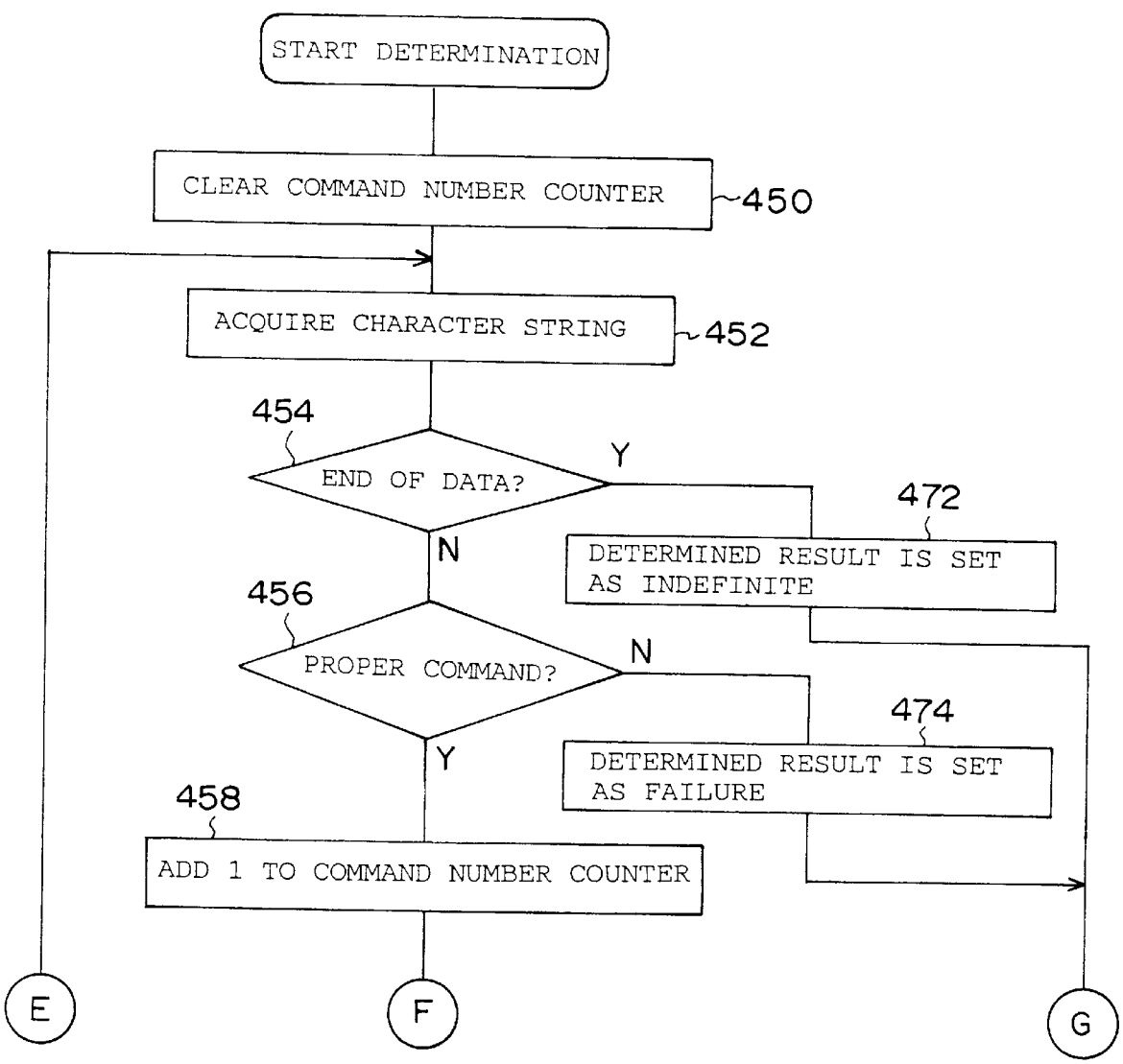

Referring to the flowcharts shown in FIGS. 15A and 15B, a description will be given of the operation of the language A determining device 84 in accordance with the classification of rules shown in Table 1.

To detect the order of appearance of commands, a command number counter is initialized at the start of determination (Step 450).

Next, a character string is acquired from the input data (Step 452). The term "character string" refers to a data string continuing until a delimiter defined by the language A is detected.

A determination is made as to whether or not the data has ended while the character string is being acquired (Step 454). If the data has ended, the result of determination is decided to be "indefinite" (Step 472), and the determination ends.

If the data has not ended, a check is made as to whether or not the acquired command is proper (Step 456). If a proper command is not detected, the result of determination is decided to be "failure" (Step 474), and the determination ends.

If a proper command is detected, the command number counter is incremented by 1 (Step 458).

Next, a check is made as to whether or not the detected command belongs to the group (3) (Step 460). If the command belongs to the group (3), i.e., if the command is one whose language should be confirmed instantly, the result of determination is decided as being "success" (Step 476), and the determination ends.

If the command does not belong to the group (3), the operation branches depending on whether the order of appearance of the acquired command is first or second (Step 462).

If the order of appearance of the acquired command is first, and the command is one which belongs to the group (1), i.e., a command which should be located at the first position in the data (YES in the determination in Step 464), the operation returns to the character string acquisition processing (Step 452) to acquire an ensuing command. On the other hand, if the detected command is one which does not belong to the group (1), i.e, the command is not one which should be located at the first position in the data (NO in the determination in Step 464) although the detected command appears at the first position in the data, the result of determination is decided as being "failure," and the determination processing ends.

If the order of appearance of the detected command is second, and the command is one which belongs to the group (2), i.e., a command which should be located at the second position in the data (YES in the determination in Step 466), the result of determination is decided as being "success," and the language A is handled as the control language. On the other hand, if the detected command is one which does not belong to the group (2), i.e, the command is not one which should be located at the second position in the data (NO in the determination in Step 466) although the detected command appears at the second position in the data, the result of determination is decided as being "failure," and the determination processing ends.

Described above is the operation of the language A determining device 84 in accordance with the second embodiment, and by performing such processing it is possible to obtain an advantage in that the average time required for determination can be shortened. Namely, although in the first embodiment the language A is determined only by the order of appearance, and it is necessary to detect at least two pieces of data, in the second embodiment if a command peculiar to the language A alone is found in the first position in the data string, the result of determination can be issued at this point of time. Hence, it suffices to detect only one piece of data. In addition, there is an advantage in that such a decrease in the amount of data to be detected means that the possibility of the result of determination becoming indefinite due to an end of data midway decreases, and the determination accuracy improves.

Next, a description will be given of the example of determination of the language C. Although the number of appearance of commands is used as the criteria of the determining rule for the language C determining device 88 in the first embodiment, in the second embodiment an additional arrangement is provided such that the determination based on a command peculiar to only the language C can be executed. Accordingly, the command groups of the language C can be classified as shown in Table 2.

TABLE 2

| Name of Group | Description of Classification |
| --- | --- |
| Group (5) | a group of commands whose language should be confirmed instantly when detected |
| Group (6) | a group of commands whose number of appearance should be counted |
| Group (7) | a group of other commands |

Figure 16A:
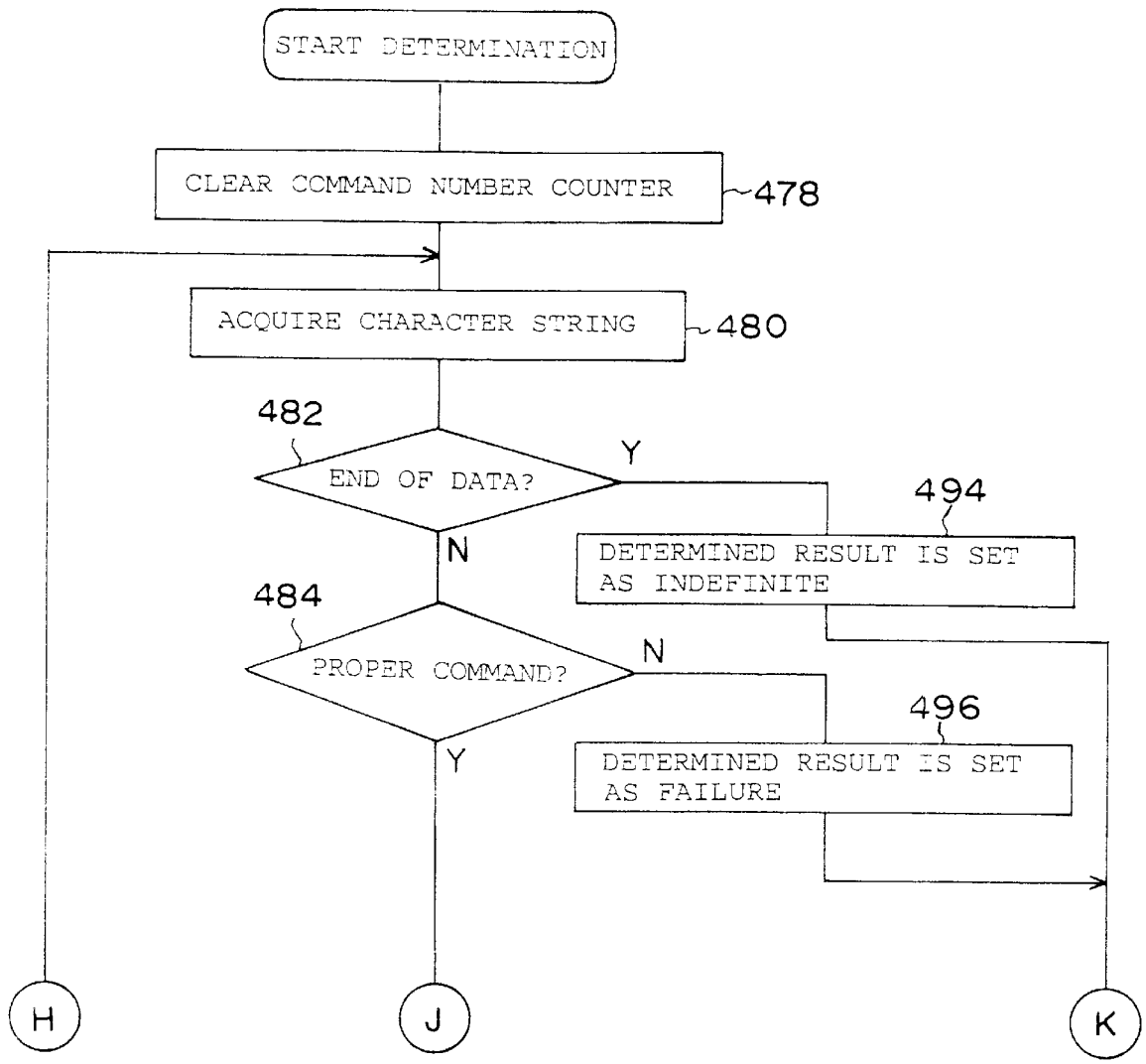

Referring to the flowcharts shown in FIGS. 16A and 16B, a description will be given of the operation of the language C determining device 88 in accordance with the classification of rules shown in Table 2.

To detect the order of appearance of commands, a command number counter is initialized at the start of determination (Step 478).

Next, a character string is acquired from the input data (Step 480). The term "character string" refers to a data string continuing until a delimiter defined by the language C is detected.

A determination is made as to whether or not the data has ended while the character string is being acquired (Step 482). If the data has ended, the result of determination is decided to be "indefinite" (Step 494), and the determination ends.

If the data has not ended, a check is made as to whether or not the acquired command is proper (Step 484). If a proper command is not detected, the result of determination is decided to be "failure" (Step 496), and the determination ends.

If a proper command is detected, a check is made as to whether or not the relevant command belongs to the group (5) (Step 486). If the command belongs to the group (5), i.e., if the command is one whose language should be confirmed instantly, the result of determination is decided as being "success" (Step 498), and the determination ends. In this case, the control language is handled as the language C.

In the case of a command belonging to the group (6), i.e., a command whose number of appearances should be counted, the command number counter is incremented by 1 (Step 488).

Next, a determination is made as to whether or not the count of the number of commands counted by the command number counter has reached five (Step 490). If the count of the number of commands has not reached five, the operation returns to the character string acquisition processing (Step 480) to repeat similar processing.

If the count of the number of commands has reached five, the result of determination is decided as being "success" (Ste 492), and the control language is handled as the language C.

Described above is the operation of the language C determining device 88 in accordance with the second embodiment, and by performing such processing it is possible to obtain an advantage in that the average time required for determination can be shortened. Namely, although in the first embodiment the language C is determined only by the number of appearances, and it is necessary to detect five commands, in the second embodiment if a command peculiar to the language C alone is found before detecting five commands, the result of determination can be issued at this point of time. In addition, there is an advantage in that such a decrease in the amount of data to be detected means that the possibility of the result of determination becoming indefinite due to an end of data midway decreases, and the determination accuracy improves.

Although the embodiments of the present invention have been described above, the present invention is not limited to the same. For example, the determining devices for determining the control languages shown in the above-described embodiments are not confined to the above-described kinds or the number of control languages. In addition, the determining rules are not limited to the check of the order of appearance and the check of the number of commands. For example, the result of addition of a weight concerning each command or priorities may be utilized.

Furthermore, the circuit configuration, functional blocks, the software configuration, the flow of control and inputs and outputs, and the like may be modified, as required. For instance, the automatic determination processing and the like may be realized by a gate array, thereby making it possible to attain even higher speed.

What is claimed is:

1. An output controlling device comprising:

storage means for storing input data;

a plurality of control-language determining means each adapted to determine that a control language of the input data is particular control language;

deciding means for deciding the control language of the input data on the basis of a result of determination by said plurality of control-language determining means; and output means for interpreting the input data on the basis of the control language decided by said deciding means, and for outputting the input data, wherein in a case in which a control-language determining means of said plurality of control-language determining means succeeds in determining the control language of input data said control-language determining means sends a result of success in the determination of the control language of the input data to said deciding means, and said deciding means decides that the control language of the input data is the control language based on the result of success sent to said deciding means by said control-language determining means in the determination of the control language of the input data.

2. An output controlling device comprising:

storage means for storing input data;

a plurality of control-language determining means each adapted to determine that a control language of the input data is particular control language;

deciding means for deciding the control language of the input data on the basis of a result of determination by said plurality of control-language determining means; and output means for interpreting the input data on the basis of the control language decided by said deciding means, and for outputting the input data, wherein in a case in which a control-language determining means of said plurality of control-language determining means succeeds in determining the control language of input data, said control-language determining means sends a result of success in the determination of the control language of the input data to said deciding means, said deciding means causes said plurality of control-language determining means to effect determination processing in decreasing order of determining speed and said deciding means decides that the control language of the input data is the control language based on the result of success sent to said deciding means by said control-language determining means in the determination of the control language of the input data.

3. An output controlling device comprising:

storage means for storing input data;

a plurality of control-language determining means each adapted to determine that a control language of the input data is particular control language;

group determining means for determining control languages as a group with respect to control-language determining means belonging to a group in which subject control languages are similar among said plurality of control-language determining means;

deciding means for deciding the control language of the input data on the basis of a result of determination by said group determining means and control-language determining means not belonging to the group; and output means for interpreting the input data on the basis of the control language decided by said deciding means, and for outputting the input data, wherein in a case in which one of said group determining means and control-language determining means not belonging to the group succeeds in determining the control language of input data, said one of said group determining means and control-language determining means not belonging to the group sends a result of success in the determination of the control language of the input data to said deciding means, and said deciding means decides that the control language of the input data is the control language based on the result of success sent to said deciding means by said one of said group determining means and control-language determining means not belonging to the group in the determination of the control language of the input data.

4. An output controlling device according to claim 3, wherein said group determining means determines the control language for the group in accordance with a predetermined criteria in a case where none of said plurality of control-language determining means are able to determine the control language of the input data as being a particular control language.

5. An output controlling device comprising:

storage means for storing input data;

a plurality of control-language determining means each adapted to determine that a control language of the input data is particular control language;

deciding means for deciding the control language of the input data on the basis of a result of determination by said plurality of control-language determining means; and output means for interpreting the input data on the basis of the control language decided by said deciding means, and for outputting the input data, wherein said deciding means decides that the control language of the input data is the control language for which the determination is successful in a case where one of said plurality of control-language determining means has succeeded in the determination of the control language.

\* \* \* \* \*